(12) United States Patent
Chiarulli et al.

(10) Patent No.: US 6,633,710 B2
(45) Date of Patent: Oct. 14, 2003

(54) OPTO-ELECTRONIC MULTI-CHIP MODULES USING IMAGING FIBER BUNDLES

(75) Inventors: Donald M. Chiarulli, Pittsburgh, PA (US); Steven P. Levitan, Pittsburgh, PA (US); Karim Tatah, Winchester, MA (US); Matthew Robinson, Charlton, MA (US)

(73) Assignees: Schott Fiber Optics, Inc., Southbridge, MA (US); University of Pittsburgh, Pittsburgh, PA (US)

(*) Notice: Subject to any disclaimer, the term of this patent is extended or adjusted under 35 U.S.C. 154(b) by 5 days.

(21) Appl. No.: 09/883,541

(22) Filed: Jun. 18, 2001

(65) Prior Publication Data

US 2002/0048427 A1 Apr. 25, 2002

Related U.S. Application Data

(60) Provisional application No. 60/212,268, filed on Jun. 19, 2000.

(51) Int. Cl.[7] ............................................... G02B 6/04
(52) U.S. Cl. ...................... 385/120; 385/115; 385/24; 385/39
(58) Field of Search ................. 385/120, 115, 385/116, 24, 39

(56) References Cited

U.S. PATENT DOCUMENTS

| | | | |
|---|---|---|---|
| 4,022,647 A | 5/1977 | Yevick | |
| 4,057,338 A | 11/1977 | Yevick | |
| 4,154,501 A | * 5/1979 | Fischer | ................ 385/120 |
| 5,173,097 A | 12/1992 | Jansen | |
| 5,268,978 A | 12/1993 | Po et al. | |
| 5,625,733 A | 4/1997 | Frigo et al. | |
| 5,651,086 A | 7/1997 | Russell | |
| 5,652,811 A | 7/1997 | Cook et al. | |
| 5,808,729 A | 9/1998 | Sugawara et al. | |
| 5,848,214 A | 12/1998 | Haas et al. | |

FOREIGN PATENT DOCUMENTS

| | | |
|---|---|---|
| EP | 0901023 A2 | 3/1999 |
| EP | 1006376 A1 | 6/2000 |
| WO | WO9950694 | 10/1999 |

OTHER PUBLICATIONS

"Distributed Crossbar Interconnects With Vertical–Cavity Surface–Emitting Laser–Angle Multiplexing And Fiber Image Guides" Applied Optics, Optical Society of America, Washington, US, vol. 37, No. 2, Jan. 10, 1998, pp. 254–263.

* cited by examiner

*Primary Examiner*—John Juba
*Assistant Examiner*—Leo Boutsikaris
(74) *Attorney, Agent, or Firm*—Volpe and Koenig, P.C.

(57) ABSTRACT

Multipath structures formed from coherent fiber bundle structures for interconnecting a number of opto-electronic devices in a compact space. The coherent fiber bundle structures are formed from fiber optic plates and have different geometries and fiber orientations in order to transmit optic signal between opto-electronic device in different locations.

18 Claims, 25 Drawing Sheets

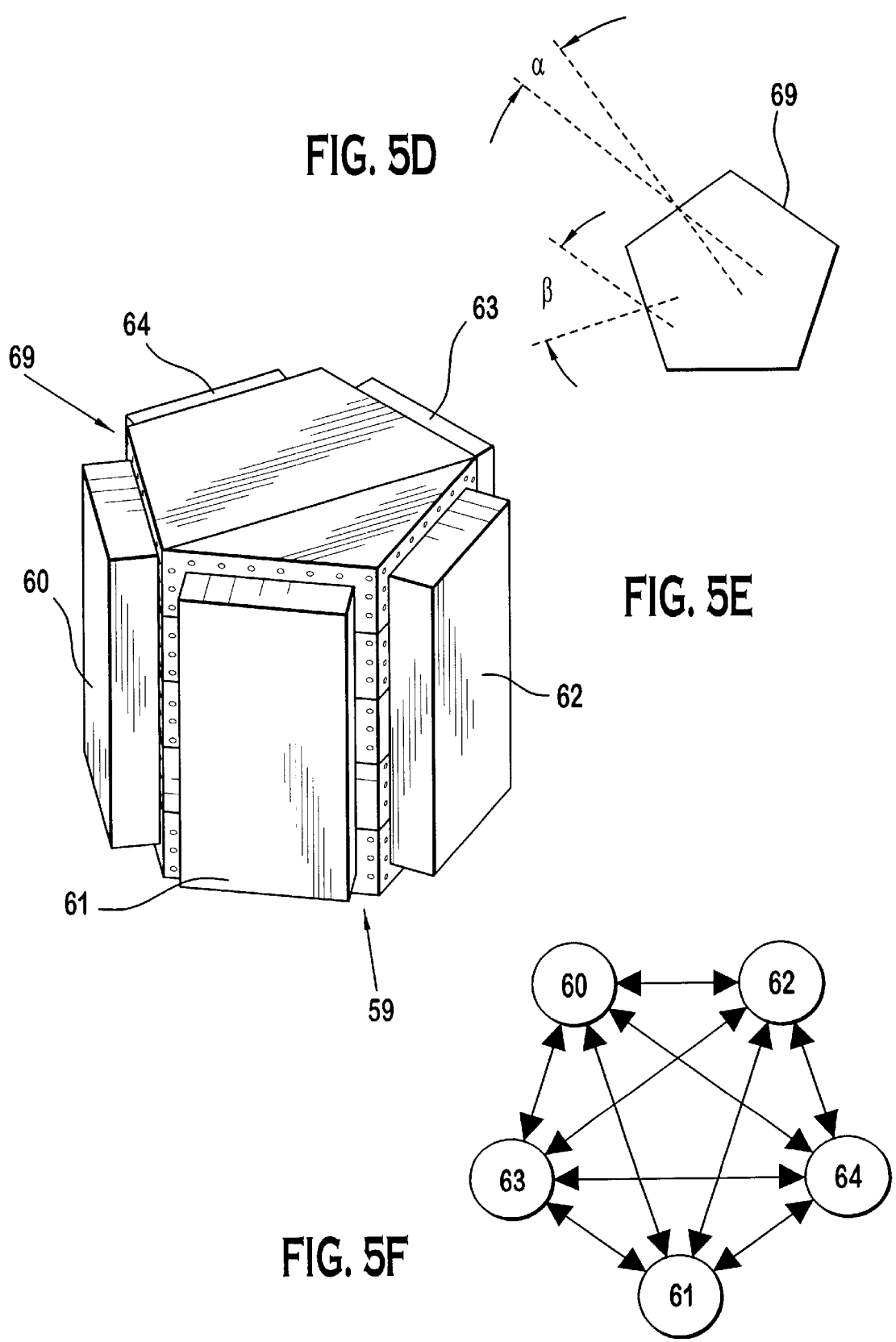

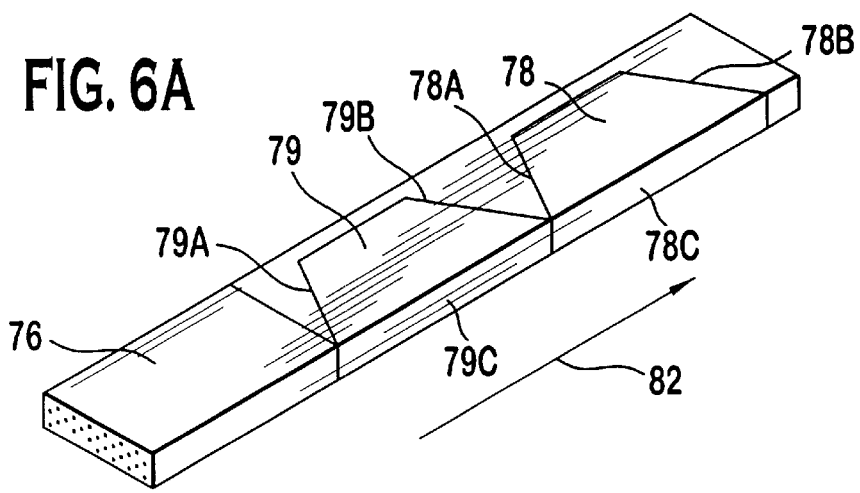
FIG. 6A
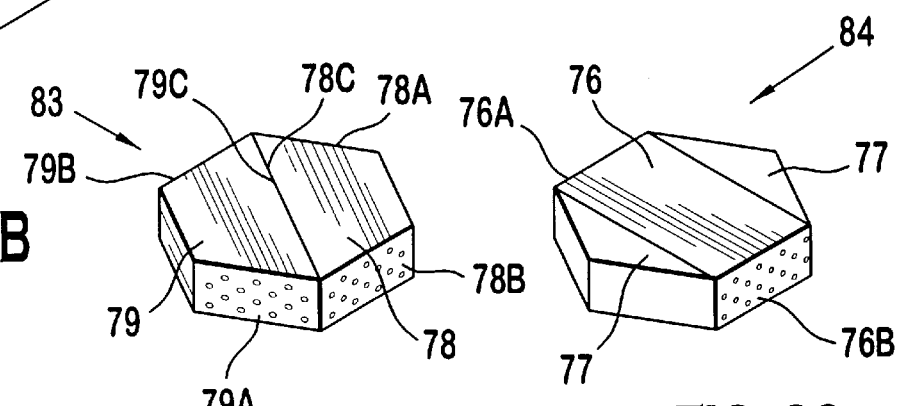
FIG. 6B
FIG. 6C
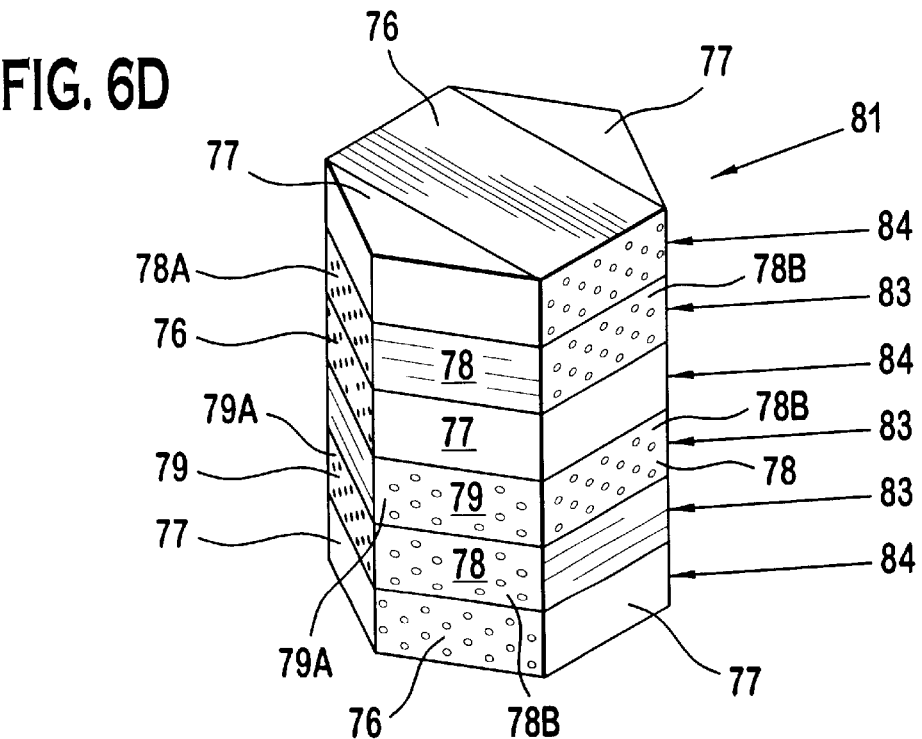
FIG. 6D

FIG. 8C
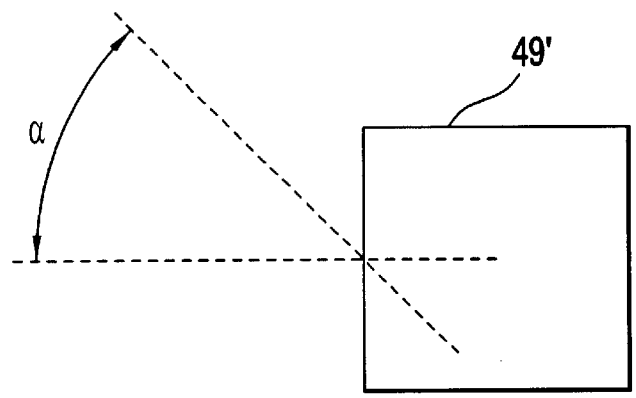
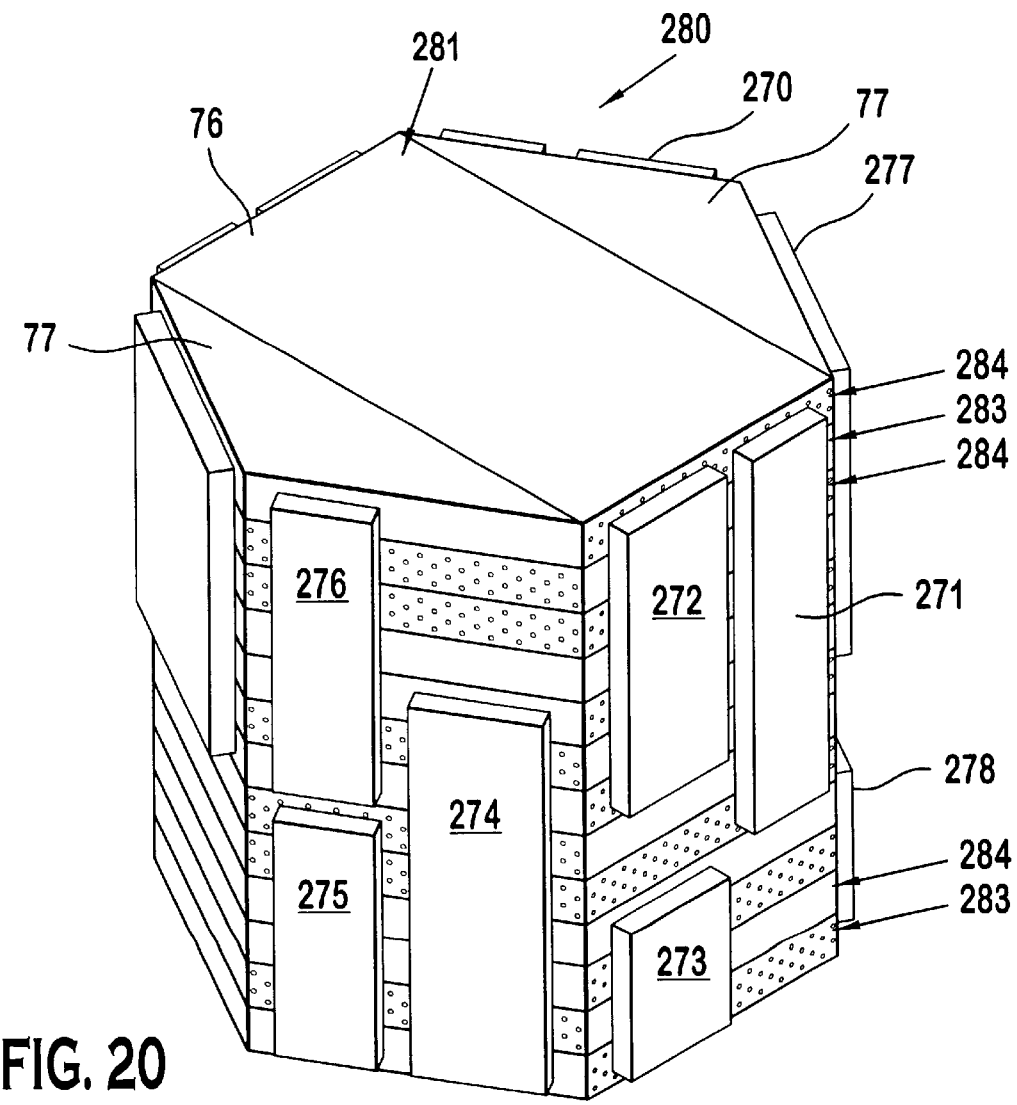
FIG. 20

OPTO-ELECTRONIC MULTI-CHIP MODULES USING IMAGING FIBER BUNDLES

CROSS-REFERENCE TO RELATED APPLICATIONS

This application claims the benefit of U.S. Provisional Application No. 60/212,268, filed Jun. 19, 2000.

BACKGROUND

The present invention involves fiber connection arrangements and methods of transmitting optical signals between optical signal emitters and detectors. More specifically, the present invention provides compact devices for connecting a plurality of optical signal emitters and detectors through image fiber bundles.

Integration of computer chips has proven to be troublesome over the years. Traditionally, inherent limitations on electrical conductor interconnections has hampered high speed communication between chips. As time progresses, integrated circuits become faster and smaller, thus, the limits of performance for these systems are further hampered by electrical resistance. To solve this problem, optic fiber interconnections were developed.

The use of fiber interconnections for optical signal transport allows high speed communications between optical signal emitters and detectors, such as Vertical Cavity Surface Emitting Lasers (VCSELs) or edge emitting lasers and photo-detectors commonly used on computer chips. While providing an acceptable alternative to electrical wire interconnections, the current state of the art provides for individual generally linear optical fibers attached between the signal emitters and detectors on two chips. The drawbacks of this are readily apparent because considerable time and labor must be spent establishing the individual fiber interconnections between optical signal emitters and detectors. It is also known to use an oversampling approach in order to alleviate some of the alignment concerns. This has proven to be somewhat successful in connecting two opto-electronic devices.

Another problem inherent in the current use of fiber optic interconnections is optical signal entry alignment to the transport fiber. Currently, alignment must be critically maintained in order for a fiber interconnection between optical signal emitters and detectors to be functional.

It has been known to use a fiber optic plate to connect two opto-electronic devices together. There is an additional limitation in that only two opto-electronic devices can be connected in a designated space. In systems using this arrangement, opto-electronic chips are positioned facing one another with a fiber optic plate located therebetween to provide the needed optical communication.

There is a need to provide an easy interconnect between optical signal emitters and detectors on multiple opto-electronic devices. There is a further need to more densely package a plurality of opto-electronic chips together to provide more compact arrangements while providing optical interconnections.

SUMMARY

The current invention provides optical signal transmission devices and methods of transmitting optical signals between optical signal emitters and detectors in a compact arrangement. The invention provides a multi-path optical signal transmission device which allows transmission of optical signals between optical signal emitters and detectors of multiple opto-electronic devices. The device comprises a multi-path structure with three active exterior faces allowing connection of multiple signal emitters and detectors, which are connected to differing exterior faces of the structure. The multi-path structure includes at least two coherent fiber bundle structures. Each coherent fiber bundle structure has at least a first, second and third face. The first face of the first coherent fiber bundle structure forms at least a portion of the first exterior face of the multi-path structure. The second face of the first coherent fiber bundle structure forms at least a portion of one of the second and third exterior faces of the multi-path structure. This provides optical communication between one of the first and second and the first and third exterior faces of the multi-path structure. A first face of the second coherent fiber bundle structure forms at least a portion of the second exterior face of the multi-path structure. The second face of the second coherent fiber bundle structure forms at least a portion of the third exterior face of the multi-path structure. This arrangement provides optical communication between the second and third exterior faces of the multi-path structure. The exterior faces of the multi-path structure are adapted to be optically connected to optical signal emitters or detectors on at least three opto-electronic devices.

In another aspect, a method of transmitting optical signals from at least three opto-electronic chips through an optical signal transmission device comprised of coherent fiber bundle structures, is provided. This method entails providing a first opto-electronic device with at least one signal emitter and detector, providing a second opto-electronic device with at least one signal detector, and providing a third opto-electronic device with one signal emitter. A first end of a first coherent fiber bundle structure is optically connected to the first opto-electronic device emitter. The second end of the first coherent fiber bundle structure is optically connected to the second opto-electronic device such that the detector on the second opto-electronic device and an emitter on the first opto-electronic device are optically connected. A first end of a second coherent fiber bundle structure is optically connected to the at least one signal detector on the first opto-electronic device. The second end of the second coherent fiber bundle structure is attached to at least one emitter on the third opto-electronic device. Optical signals emitted from the at least one signal emitter of the first and third opto-electronic devices and are transmitted through the coherent fiber bundle structures of the optical signal transmission device to the optically connected signal detectors.

In another aspect, the invention provides an end-bonded structure, used as a optical signal transmission device, to connect optical signal emitters and detectors. The end-bonded structure is comprised of a first group of at least two coherent fiber bundles, each having first and second ends, and a second group of at least two coherent fiber bundle structures, each having first and second ends. The second ends of the first and second fiber bundle groups are side-connected together. The side-connected second ends of the first group are optically connected to the second ends of the second group, with the second ends of the second group being collectively rotated approximately 90° about a common axis relative to the second ends of the first group. The first ends of the first and second stacks are adapted for connection to opto-electronic devices.

In another aspect, an optical signal transmission device is provided having at least four coherent fiber bundle plates. The plates are positioned to form a rectilinear structure having a top face, a bottom face and four side exterior faces.

The side exterior faces are adapted for coupling to opto-electronic devices. At least two of the stacked coherent fiber bundle plates provide optical communication between two adjacent side exterior faces of the structure. Additionally, at least two of the coherent fiber bundle plates provide optical communication between non-adjacent side exterior faces.

In another aspect, another configuration of an optical signal transmission device used to connect opto-electronic chips is provided. The optical signal transmission device is constructed from at least three coherent fiber bundle plates, the plates each having five exterior side faces, a top face and a bottom face. The exterior side faces of the at least three coherent fiber bundle plates are arranged to provide optical communication between at least two pairs of adjacent exterior side faces, as well as at least one pair of non-adjacent exterior side faces.

In another aspect, another configuration of an optical signal transmission device is provided. The device comprises at least six coherent fiber bundle plates in a stacked arrangement having six exterior sides, a top face and a bottom face. The coherent fiber bundle plates are arranged to provide optical communication between at least three pairs of adjacent sides. The exterior faces of the device are adapted to be optically connected to opto-electronic devices.

In another aspect, an optical signal transmission device is provided having four coherent fiber bundle structures. The first and the fourth structures have a top portion which has a pyramid shape with an apex and a larger base end. The second and third coherent fiber bundle structures have two cojoined sections, each section including a top portion which has a pyramid shape with an apex and a larger base end, with the two apexes of the pyramid shapes connected by a transition piece. The transition pieces of the second and third coherent fiber bundle structures are located in an axially perpendicular orientation. The first and fourth coherent fiber bundle structures are oriented adjacent to the second and third coherent fiber bundle structures such that at least four of the pyramid sides of the first and fourth coherent fiber bundle structures are in optical communication with at least two pyramid sides of the second coherent fiber bundle structure and two pyramid sides of the third coherent fiber bundle structure. The exterior faces of the coherent fiber bundle structure are adapted for connection to opto-electronic devices.

In another aspect, an optical signal transmission device used to spatially divide a plurality of input optical signals is also provided. The device is a multi-path structure having at least six exterior faces. The multi-path structure has at least two coherent fiber bundle structures comprised of parallel optic fibers extending from an input side to an output side. The optic fibers of each coherent fiber bundle structure are oriented at an angle of less than 90° from the input and output sides. The first coherent fiber bundle structure is oriented such that the optic fibers extend in a first orientation, and the second coherent fiber bundle structure is placed on the first coherent fiber bundle structure such that the optic fibers of the second coherent fiber bundle structure extend in a second orientation. The input sides of the coherent fiber bundle structures are aligned with a first exterior face of the multi-path structure. The respective output sides of the coherent fiber bundle structures are aligned with at least one exterior face of the multi-path structure. At least one of the exterior faces of the structure is adapted to receive optical signals from a 1×m array, and at least one other exterior face is adapted to emit optical signals received by the multi-path structure in $1 \times n_1$ through $1 \times n_L$ arrays where L>1 and a sum of $n_1$ to $n_L$=m. The $n_1$ through $n_L$ arrays are offset from one another.

In another aspect, the invention provides a method of routing an optical signal from a defined input position through an optical signal transmission device to a desired output position. The method includes transmitting an optical signal into a first face portion of a multi-path structure comprising 2 n stacked coherent fiber bundle structures which defines an m×n array of receptor areas; receiving the optical signal at a detector array on an optically connected opto-electronic processing device having n vertically stacked horizontal 1×m detector arrays with corresponding alternately stacked 1×r emitter arrays, optically connected to a second face portion of the multi-path structure, each vertically stacked horizontal 1×m detector array being aligned with one of the stacked coherent fiber bundle structures which has parallel optic fibers oriented in a first direction and each 1×r emitter array being aligned with one of the stacked coherent fiber bundle structures having parallel optic fibers oriented in a second direction; processing the received optical signal in an associated nth vertically stacked horizontal 1×m detector array and generating a corresponding signal at a desired emitter $r_x$ in the corresponding 1×r emitter array; emitting a second optical signal from the emitter r; transmitting the second optical signal through the multi-path structure to a third face portion of the multi-path structure; receiving the transmitted optical signal at an rth detector array on a second optically connected opto-electronic processing device having r horizontally stacked vertical 1×n detector arrays with corresponding 1×s emitter arrays; processing the transmitted optical signal in the rth horizontally stacked 1×n detector array and generating a corresponding signal at a desired emitter $s_y$ in the corresponding 1×s emitter array; and emitting a third optical signal through the multi-path structure to the fourth face portion in a desired $r_x$, $s_y$ position.

In another aspect, the invention provides an optical signal transmission device having first and second optical signal detector/emitter arrays. A multi-path structure having at least four exterior faces is located between the detector/emitter arrays. The multi-path structure is adapted to transmit an optical signal from an input position in an m×n array to a desired output position in a r×s array, where m, n, r and s are integers greater than zero and m equals r and n equals s. The multi-path structure is optically connected to the detector/emitter arrays. The multi-path structure has two groups of coherent fiber bundle structures. The first group of coherent fiber bundle structures is comprised of parallel optic fibers extending from a first exterior face portion of the multi-path structure to a second exterior face portion of the multi-path structure. The parallel optic fibers are oriented at an angle of less than 90° from the connected faces. The first face portion defines an array of receptor areas for transmission of optical signals through the first group of coherent fiber bundle structures along a first pathway to a first array of emission areas on the second face which are optically connected to the first optical signal detector/emitter array. The first faces of the first group of coherent fiber bundle structures are located on the first exterior face of the multi-path structure and the second faces of the first group of coherent fiber bundle structures are located on the second exterior face of the multi-path structure. The second group of the coherent fiber bundle structures are stacked with the first group of coherent fiber bundle structures. The second group of coherent fiber bundle structure are comprised of parallel optic fibers extending from the second face of the multi-path structure to another face of the multi-path structure and are optically connected to the second optical signal detector/emitter array. The first optical signal detector/emitter array has n rows of m optical detectors and a corresponding n rows of r emitters, each row being aligned with a respective coherent fiber bundle structure. The first detector/emitter array is adapted to receive an input optical signal into a first optical detector m and activate a desired optical signal emitter $r_x$ in a corresponding row to the first optical detector on the first detector/emitter array to generate a second optical signal. The second optical signal detector/emitter array has r columns of n detectors and a corresponding r columns of s emitters. The second optical signal detector/emitter array is adapted to receive the second optical signal in an nth detector in an aligned column of the r columns of optical detectors and activate a desired optical signal emitter $s_y$ in a corresponding r column to the nth optical detector to generate a third optical signal in a desired location.

BRIEF DESCRIPTION OF THE DRAWING(S)

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 5D is a top view illustrating the optical signal insertion angles for the five chip optical signal transmission device of FIG. 5C.

FIG. 5E is a perspective view of the five chip optical signal transmission device with opto-electronic devices installed.

FIG. 5F is a schematic view of the interconnection topology for the five chip optical signal transmission device of FIG. 5E.

FIG. 6A is a perspective view showing the formation of the coherent fiber bundle structures for a six chip optical signal transmission device.

FIG. 6B is a perspective view showing the arrangement of the coherent fiber bundle structures of FIG. 6A to form a first hexagon plate.

FIG. 6C is a perspective view showing the arrangement of the coherent fiber bundle structures of FIG. 6A to form a second hexagon plate.

FIG. 6D is a perspective view of a vertical stack arrangement of the hexagon plates to form a multi-path structure for a six chip optical signal transmission device.

FIG. 8C is a top view showing an optical signal insertion angle for the optical signal transmission device in FIG. 8B.

FIG. 20 is a perspective view of a multi-chip OSTD in accordance with another embodiment of the invention.

DETAILED DESCRIPTION OF THE PREFERRED EMBODIMENTS

For consistency and definition of terms used throughout the detailed description, several abbreviations are used throughout the application: A coherent fiber bundle structure, hereinafter, CFBS, is a plurality of fused parallel optic fibers manufactured to have a specific shape. A multi-path structure, hereinafter, MPS, is a combination of CFBSs which allows transmission of optical signals to different locations in the structure based upon the oriental of the optic fibers in the CFBSs. Generally, the MPS is a single piece assembled from individual CFBSs placed in a defined arrangement. An optical signal transmission device, hereinafter, OSTD, is one or more coherent fiber bundle structures or an MPS allowing transmission of optical signals.

Figure 1A:
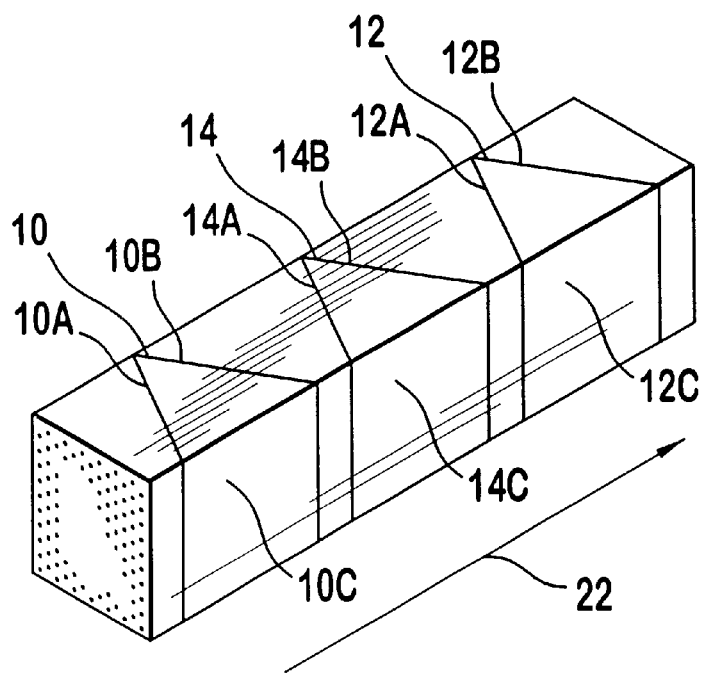
FIG. 1A is a perspective view showing the formation of coherent fiber bundle structures for a three chip optical signal transmission device.

FIG. 1A shows the formation of individual CFBSs to construct an MPS 19 for a three chip OSTD 8. CFBSs 10, 12, and 14 are produced from a piece of fused optic fiber material, similar to a fiber optic face-plate. The fiber direction 22 of the material is in a specific orientation to the CFBSs 10, 12 and 14 and indicates the direction which optical signals may travel through the material. The CFBSs 10, 12 and 14 produced in this manner provide for optical signal communication capabilities between exterior sides 10A and 10B, 12A and 12B, and 14A and 14B for pieces 10, 12 and 14, respectively. Sides 10C, 12C and 14C of the CFBSs 10, 12, 14 are non-transmissive, since they are parallel to the fiber direction 22. Although CFBSs 10, 12 and 14 are shown as being constructed from one piece of fiber optic material, preferably through cutting and polishing of the transmissive faces 10A, 10B, 12A, 12B, 14A, 14B, the CFBSs 10, 12 and 14 may be constructed from more than one piece of material as long as the fiber direction 22 is maintained relative to the layout of each CFBS. As one skilled in the art will recognize, cutting, forming, drawing, and/or other applicable means may be used to create the CFBSs 10, 12 and 14. The diameter of the optic fibers in the CFBSs may be varied as user requirements dictate for connection to optical signal sending and receiving devices.

Figure 1B:
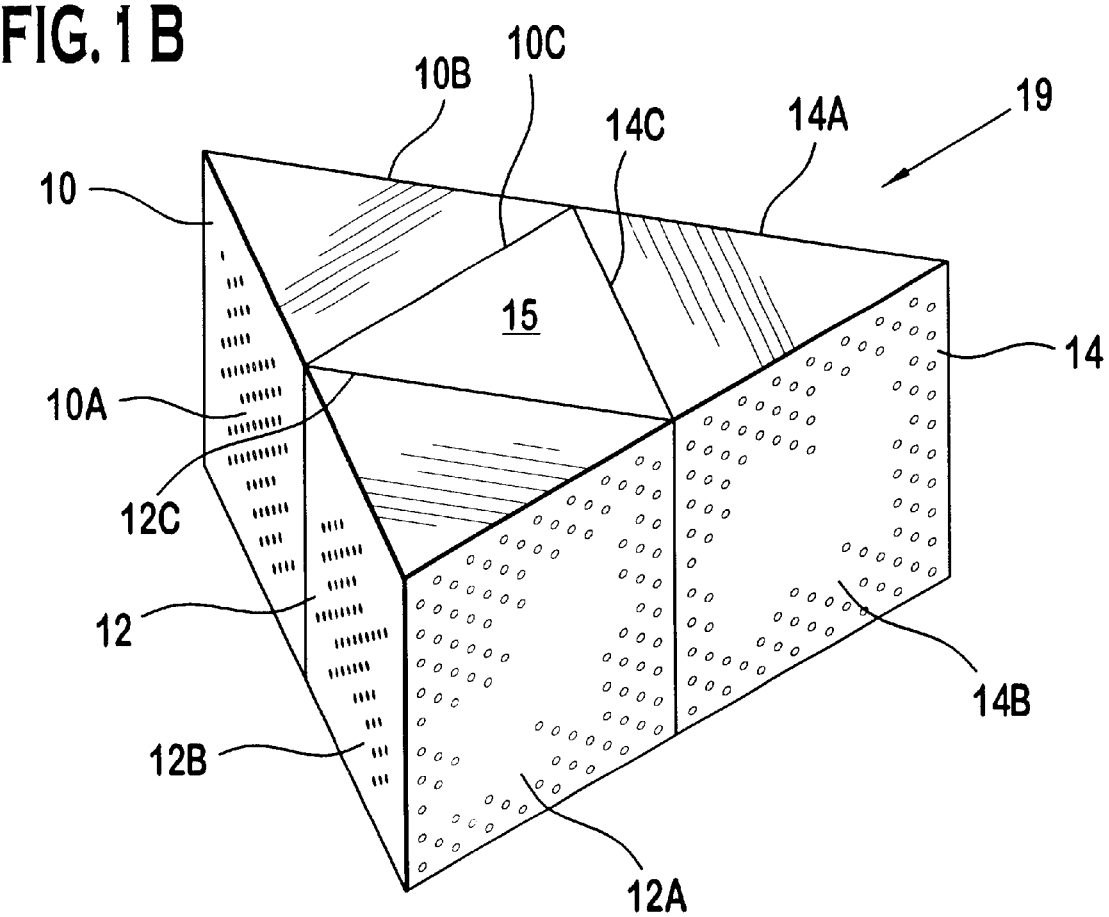
FIG. 1B is a perspective view of a horizontal arrangement of the coherent structures of FIG. 1A to form a multi-path structure for a three chip optical signal transmission device.
Figure 1C:
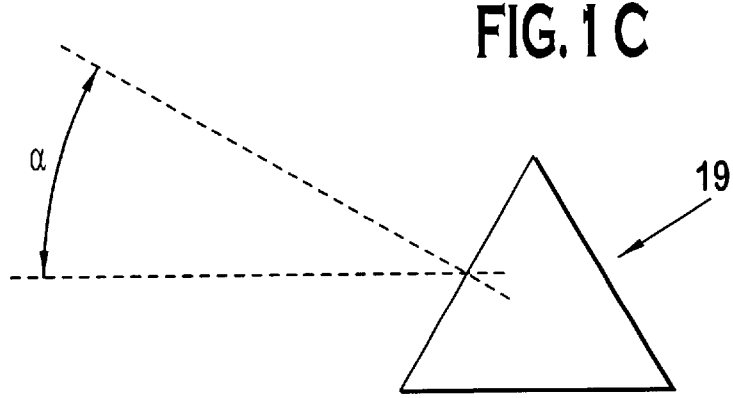
FIG. 1C is a top view which illustrates the optical signal insertion angle into an exterior side of a three chip optical signal transmission device.
Figure 1D:
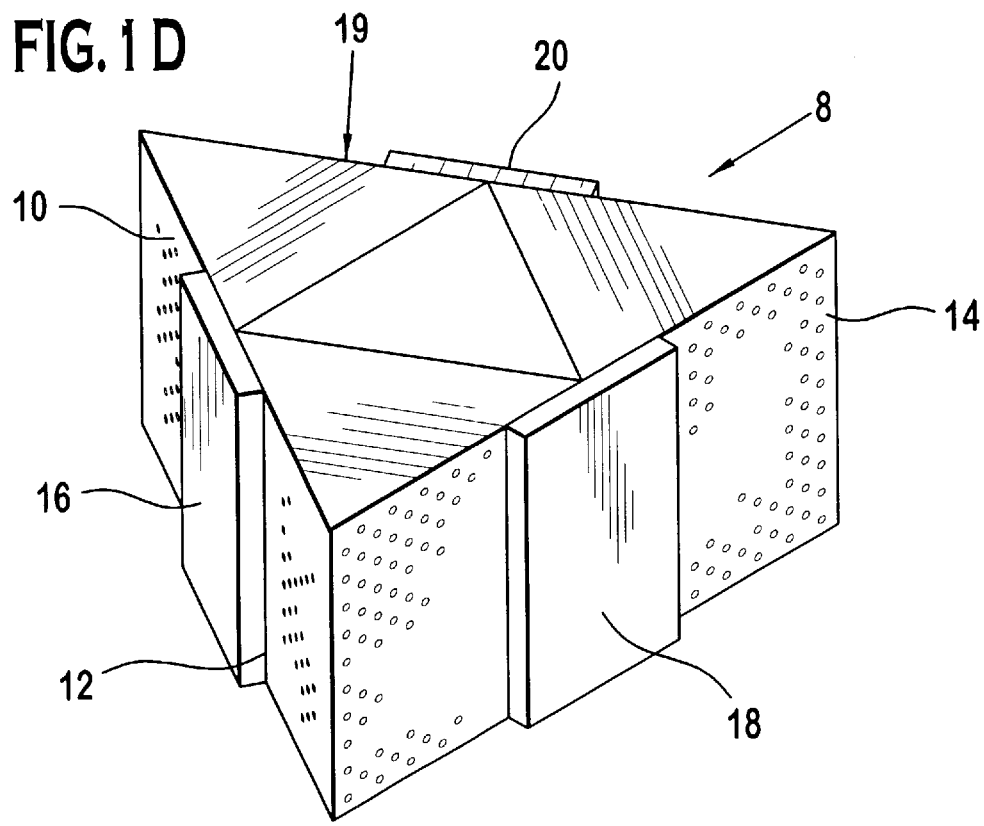
FIG. 1D is a perspective view of the three chip optical signal transmission device horizontal arrangement with opto-electronic devices.

FIG. 1B shows a horizontal arrangement of the CFBSs 10, 12, and 14 from FIG. 1A to form the MPS 19 for the three chip OSTD 8, shown in FIG. 1D, by aligning the CFBSs 10, 12 and 14 so that the non-transmissive sides 10C, 12C and 14C form a triangle shape. The exterior faces 10A, 10B, 12A, 12B, 14A and 14B of the CFBSs 10, 12, and 14 are aligned in planes as shown, and are adapted to be connected to opto-electronic devices, such as an opto-electronic chip. As those skilled in the art will recognize, arrays of optical signal emitters and detectors may be optically connected to or installed on the exterior faces 10A, 10B, 12A, 12B, 14A, 14B for sending and receiving optical signals. The CFBSs 10, 12, 14 are held in their relative positions in the MPS 19 by connecting them to a core 15 by fusion, an adhesive or other appropriate means.

FIG. 1C illustrates the insertion angle α at which optical signals may be received by the three chip OSTD 8 in FIG. 1B. In the horizontal configuration, an optical signal insertion angle $\propto$ of approximately 30° or less as measured from the perpendicular axis to the external face of the MPS 19 will allow an optical signal to be received and transmitted through the OSTD 8 with low insertion losses.

FIG. 1D shows the three chip OSTD 8 in a horizontal configuration with installed opto-electronic devices, such as opto-electronic chips 16, 18, and 20. In this arrangement, optical communication is provided between the exterior sides 10A and 10B, 12A and 12B, and 14A and 14B of the OSTD 8. The opto-electronic chips 16, 18, 20 are positioned such that the transmitters of one or more chips 16, 18, 20 are optically connected to the detectors of one or more of the other chips 16, 18, 20 via the MPS 19. As one skilled in the art will recognize from the present disclosure, the opto-electronic chips 16, 18 and 20 may be substituted with arrays of detectors and/or emitters on the exterior sides of the MPS 19, or coherent fiber bundles connected to remote detectors and/or emitters.

Figure 1E:
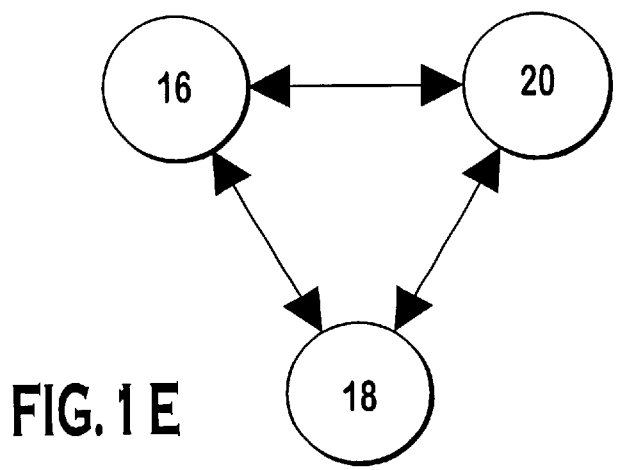
FIG. 1E is a schematic diagram of the interconnection arrangement between the installed opto-electronic devices for the three chip optical signal transmission device of FIG. 1D.

FIG. 1E illustrates the interconnection topology between the installed opto-electronic chips 16, 18 and 20 of the OSTD 8 of FIG. 1D. Each of the opto-electronic chips 16, 18, and 20 have two-way optical signal communication with one another using this horizontal configuration. However, it is within the scope of the present invention to provide the OSTD 8 with at least an emitter optically connected to one face, an emitter and a detector optically connected to the second face and a detector optically connected to the third face of the MPS 19 to provide at least two communication paths between the three faces of the MPS 19.

Figure 2A:
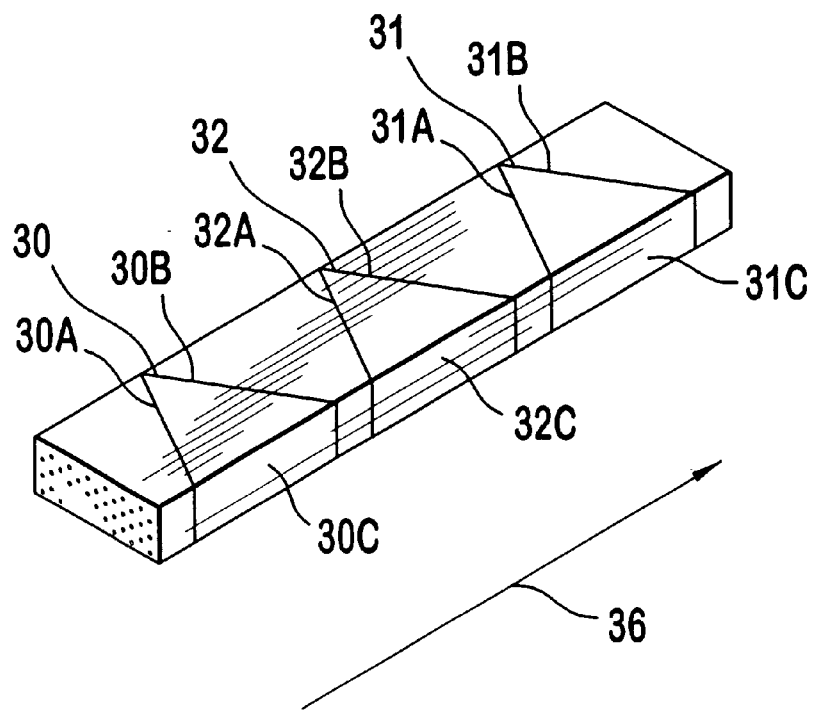
FIG. 2A is a perspective view showing the formation of coherent fiber bundle structures for a three chip optical signal transmission device having a vertical arrangement.
Figure 2B:
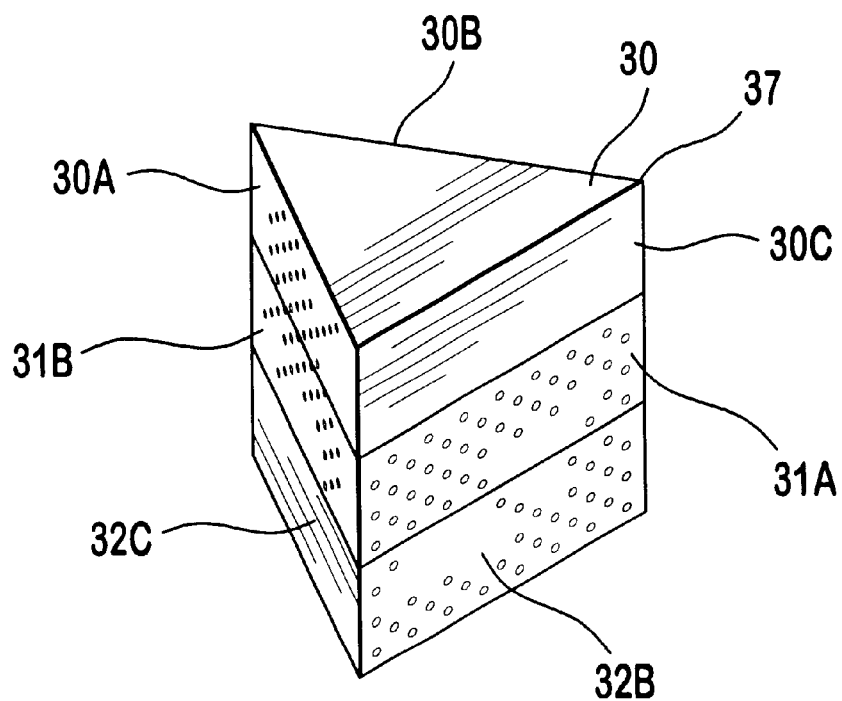
FIG. 2B is a perspective view of a vertical stacked arrangement of the coherent fiber bundle structures of FIG. 2A.

An alternate stacking arrangement is also provided for a three chip OSTD 28, as shown in FIGS. 2A and 2B. FIG. 2A shows three CFBSs 30, 31, and 32, which are preferably produced from a single piece of fused optic fiber material, for an MPS 37 used for a vertically stacked three chip OSTD 28. The fiber direction 36 extends in the direction shown. The CFBSs 30, 31, and 32 are produced with the sides, 30C, 31C, 32C, being parallel to the fiber direction 36. The CFBSs 30, 31, 32 include transmissive exterior sides 30A, 30A, 31A, 31B and 32A and 32B respectively. The formation of CFBSs 30, 31 and 32 in this manner allows optical communication between exterior sides 30A and 30B, 31A and 31B, and 32A and 32B of the CFBSs 30, 31 and 32, respectively. As one skilled in the art will recognize from this disclosure, the formation of CFBSs 30, 31 and 32 may be accomplished through cutting, forming, drawing or other appropriate optical shape production means. Additionally, more than one piece of fiber optic material may be used to produce the CFBSs.

FIG. 2B shows a vertically stacked arrangement of the CFBSs 30, 31, and 32 to form an MPS 37. CFBS 30 is positioned with side 30C in a planar orientation to sides 31B and 32A of CFBSs 31 and 32, respectively. This produces a triangular shaped structure with a top and bottom face. The sides of the vertical stacked MPS 37 are adapted to be connected to opto-electronic devices. The CFBSs 30, 31 and 32 are held in vertical alignment by an adhesive, fusion or other appropriate means.

Figure 2C:
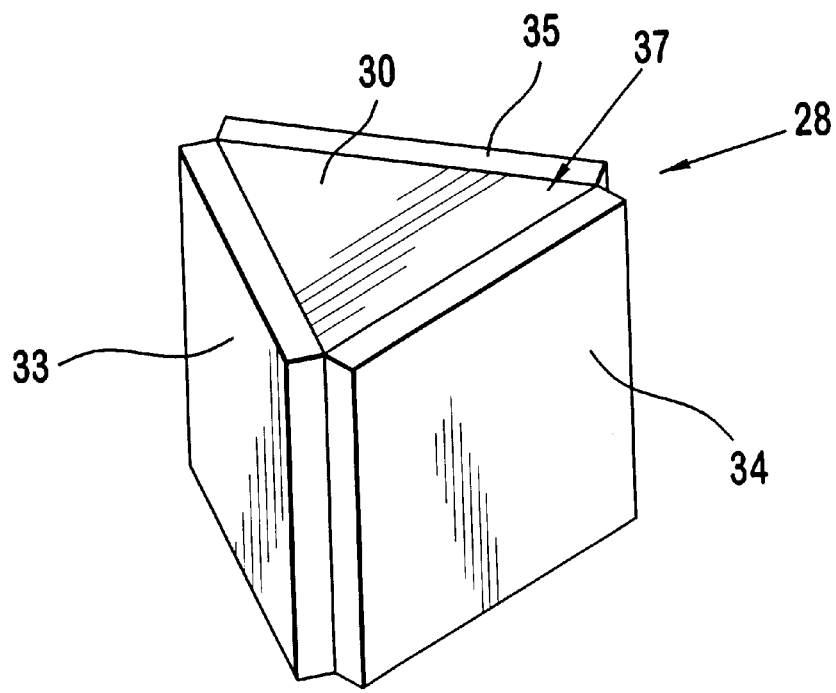
FIG. 2C is a perspective view of the vertical stacked arrangement of FIG. 2B with three opto-electronic devices to form a multi-path structure.
Figure 2D:
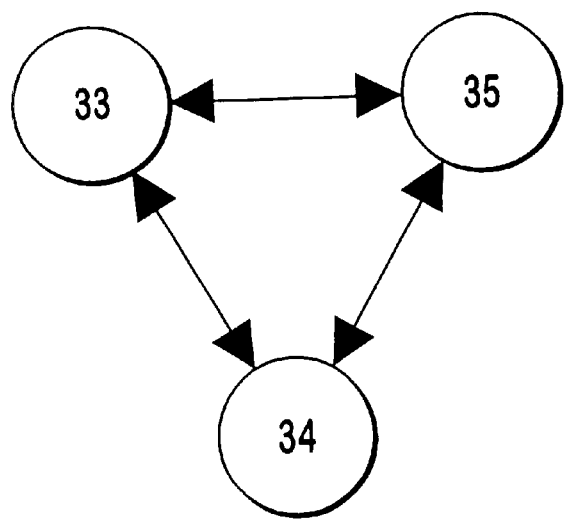
FIG. 2D is a schematic view of the interconnection topology for the installed opto-electronic device in the vertical stack arrangement of FIG. 2C.

FIG. 2C shows the three chip OSTD 28 with opto-electronic devices, such as opto-electronic chips 33, 34, 35 installed on the MPS 37. The opto-electronic chips 33, 34, and 35 receive and send optical signals through the CFBSs 30, 31 and 32. FIG. 2D shows the interconnection topology for the three chip vertical stacked OSTD 28. As shown in FIG. 2D, preferably all installed opto-electronic chips 33, 34 and 35 have two way optical signal communication capability between them. However, those skilled in the art will recognize that one or two-way communication between two or more of the chips 33, 34, 35 is possible. As noted above in connection with the first embodiment, other types of opto-electronic devices may be used in connection with the OSTD 28.

Figure 3A:
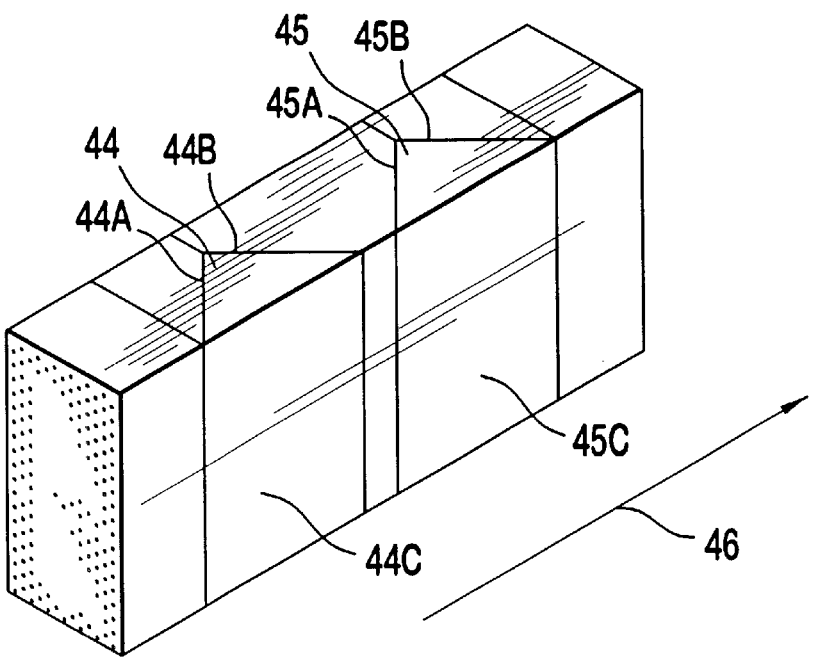
FIG. 3A is a perspective view showing the formation of coherent fiber bundle structures for a four chip optical signal transmission device.

Referring now to FIGS. 3A–3D, a four chip OSTD 38 is shown. FIG. 3A shows the production of CFBSs 44, 45, preferably produced from a piece of fiber optic material, which are used to construct the MPS 39. The fiber direction 46 is also shown. Two sides 44C and 45C, which extend in the fiber direction 46, are non-transmissive. Two additional exterior sides 44A, 44B and 45A, 45B are also produced for the CFBSs 44, 45. The fiber direction 46 allows optical signal transmission between exterior sides 44A and 44B and exterior sides 45A, 45B.

Figure 3B:
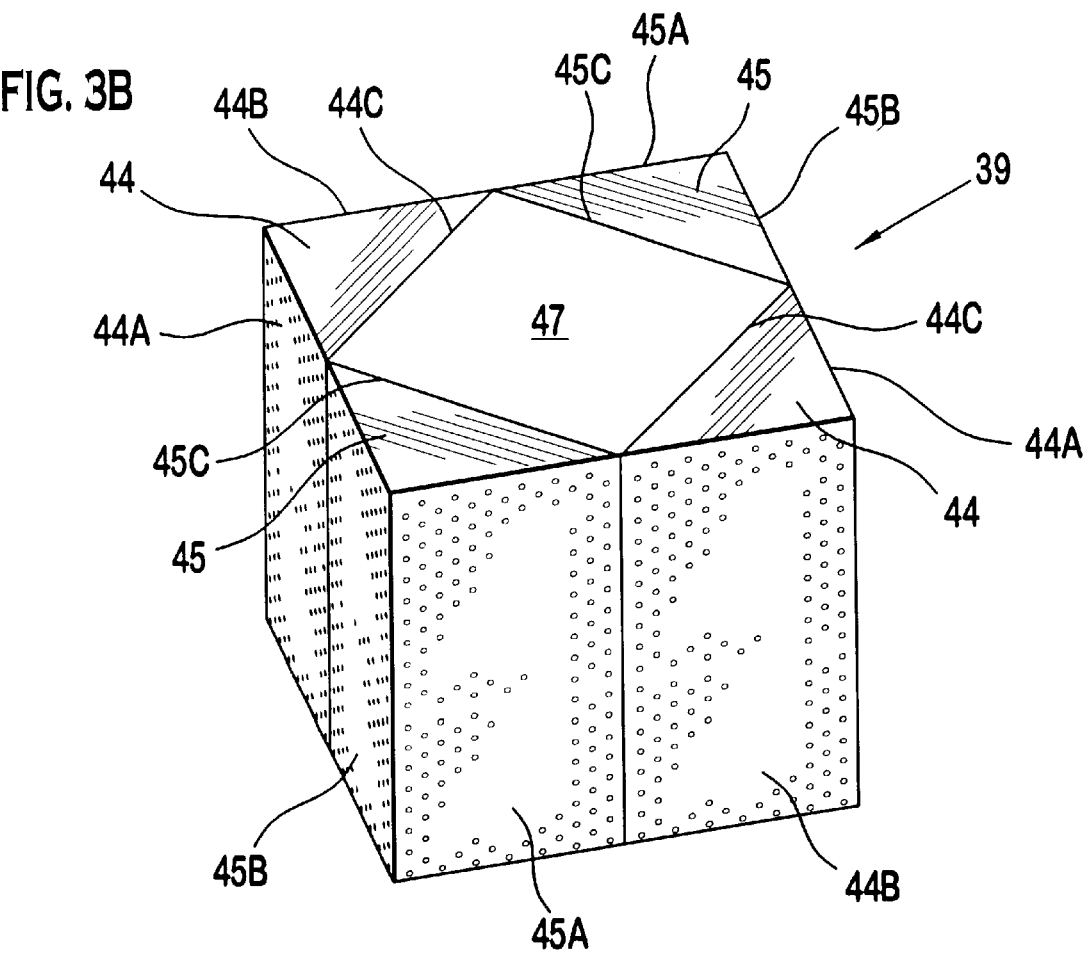
FIG. 3B is a perspective view of a multi-path structure for a four chip optical signal transmission device formed from the coherent fiber bundle structures of FIG. 3A.

FIG. 3B shows the arrangement of two pairs of CFBSs 44 and 45 to form the MPS 39 which provides opto-electronic signal communication between the sides of the OSTD 38. The exterior facing sides of the MPS 39 are adapted for connection to opto-electronic devices, such as opto-electronic chips. As one skilled in the art will recognize, arrays of emitters and detectors may be attached to the exterior sides of the MPS 39 or may be connected from a remote location via fiber optic cables. The two pairs of coherent fiber bundle structure 44 and 45 are attached to a core 47 which provides support for the structure. The attachment may be made by an adhesive, fusion or other appropriate means.

Figure 3C:
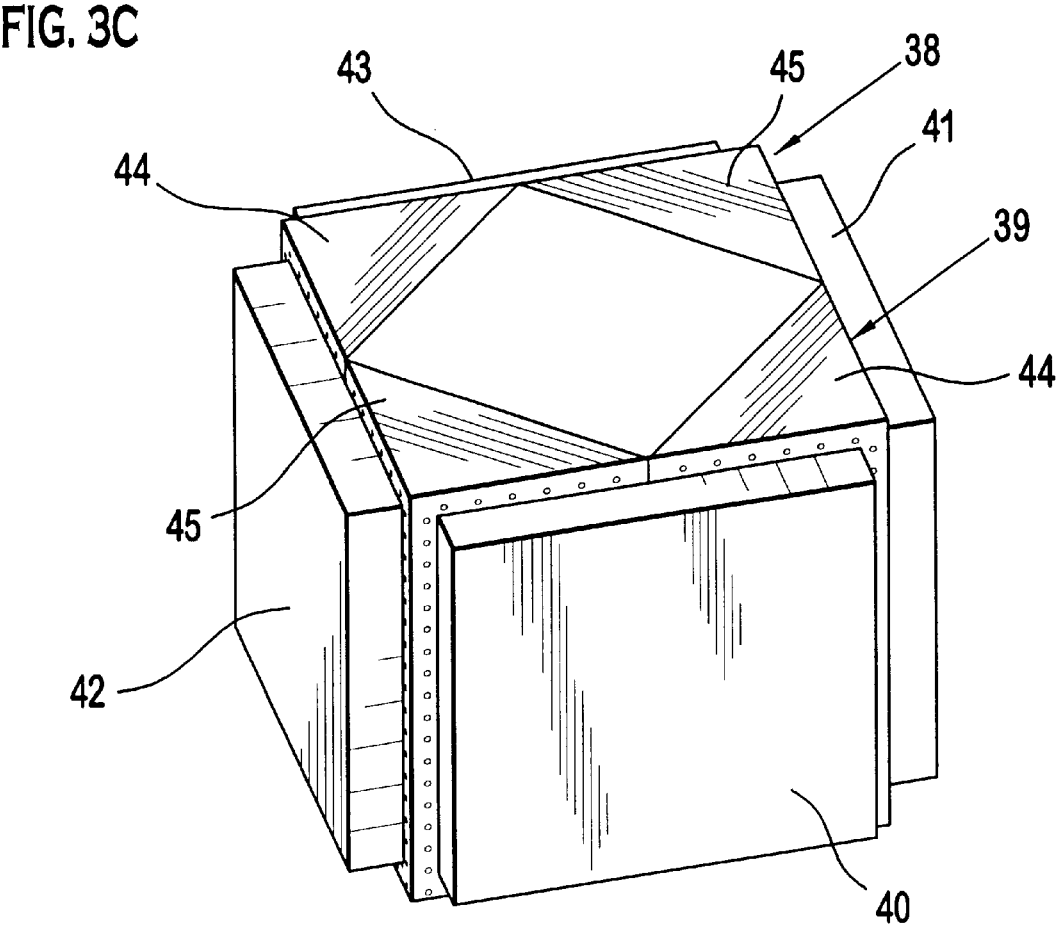
FIG. 3C is a perspective view of the four chip optical signal transmission device of FIG. 3B with opto-electronic devices installed.
Figure 3D:
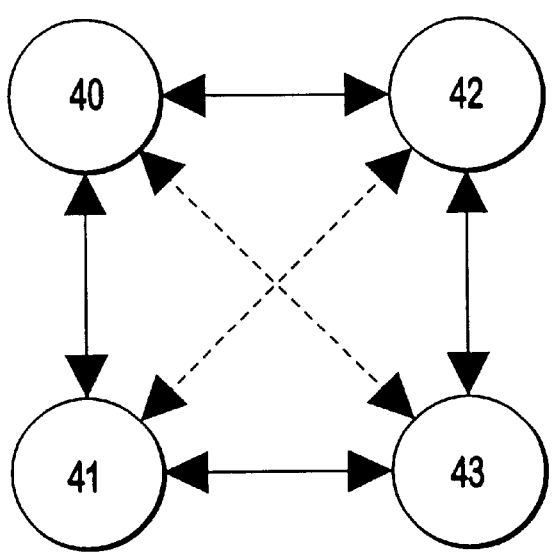
FIG. 3D is a schematic view of the interconnection topology for the four chip optical signal transmission device of FIG. 3C.

FIG. 3C illustrates the four chip OSTD 38 with optically connected opto-electronic chips 40, 41, 42, and 43 on the exterior sides of the device. As a result of this arrangement, optical signal transmission capability is achieved between the adjacent exterior sides. Any connected opto-electronic chip may communicate with any adjacent chip. FIG. 3D illustrates the above interconnection between opto-electronic chips 40, 41, 42 and 43. All installed opto-electronic chips 40, 41, 42 and 43 have optical communication capability between them, either directly, as indicated in solid lines, or indirectly through an adjacent chip acting as a signal relay, as indicated by dashed lines.

Figure 4A:
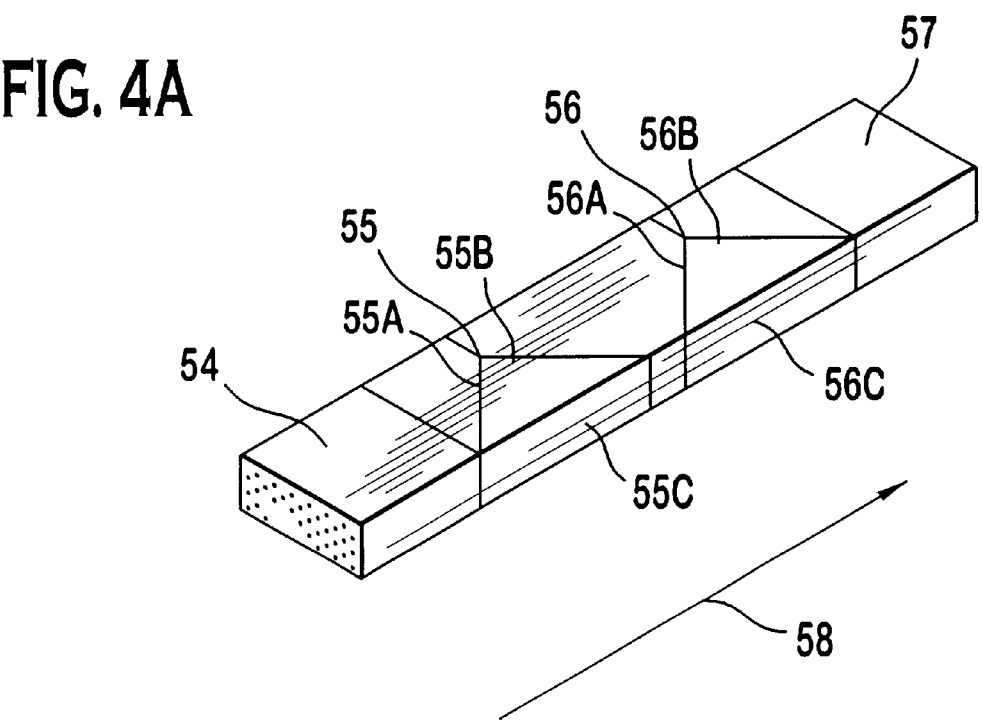
FIG. 4A is a perspective view showing the formation of coherent fiber bundle structures for an alternate embodiment of a four chip optical signal transmission device.

Referring now to FIGS. 4A–4D, an alternate embodiment of a four chip OSTD 48 is shown. FIG. 4A shows the production of four CFBSs 54, 55, 56, 57 from a single piece of fiber optic material used to construct the MPS 49 for the four chip OSTD 48. The fiber direction 58 indicates the transmission direction through the CFBSs 54, 55, 56 and 57. The CFBSs 54 and 57 as well as two each of CFBSs 55 and 56 are arranged to form an MPS 49 to allow optical signal transfer capability directly between adjacent as well on opposite external sides. CFBSs 54 and 57 are produced from fused optic fiber material to form block shaped CFBSs 54 and 57 that allow optical signal communication across non-adjacent faces of the MPS 49. The exterior sides, 55A, 55B, 56A, 56B of CFBSs 55, 56, respectively, have optical signal communication transfer capability between them. In these CFBSs, 55, 56, non-transmissive sides 55C and 56C are also formed. As one skilled in the art will recognize, the CFBSs 55, 56 may be combined and produced as one piece. Additionally, it is possible for the CFBSs to be produced from more than one piece of fused optic fiber material, as long as the desired fiber direction of each CFBS is maintained. Furthermore, the CFBS may be produced by drawing, cutting, and/or forming, and the transmissive sides are preferably polished.

Figure 4B:
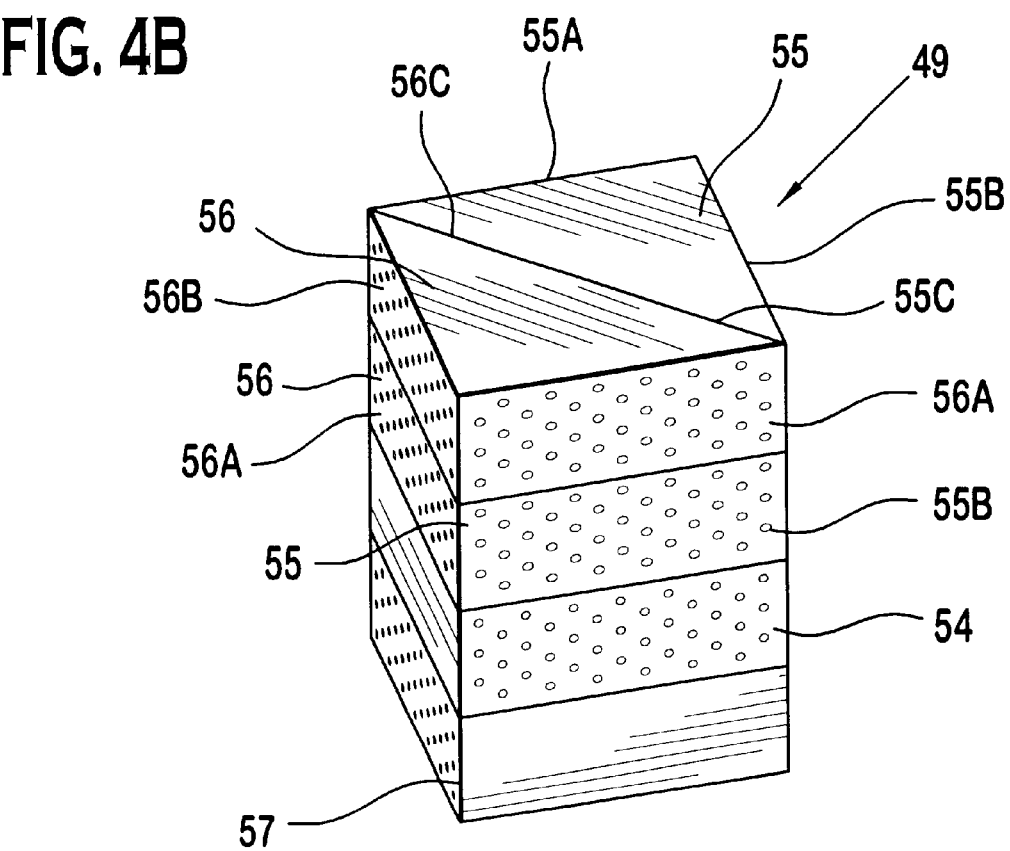
FIG. 4B is a perspective view of the alternate embodiment of the multi-path structure for a four chip optical signal transmission device formed from the coherent fiber bundle structures of FIG. 4A.

FIG. 4B illustrates the stacking arrangement of four CFBSs 54, 55, 56, 57 of FIG. 4A to form the MPS 49 for the four chip OSTD 48. Referring to FIG. 4B, the CFBSs 54, 57 and two of CFBSs 55 and 56 are stacked such that the non-transmissive sides 55C and 56C are joined in a single plane, producing a rectangular shaped polygon. This joining may be by fusing, an adhesive or other appropriate means, or the CFBSs 55, 56 may be formed as one piece. The second layer from the top of the MPS 49 is formed in the same manner; however, the rectangular shaped polygon is rotated 90° relative to the axis formed by the connection line between the sides 56C and 55C. The third layer is formed from a single coherent fiber bundle structure 54. Coherent fiber bundle structure 57 is placed on the bottom of the structure, but is rotated 90° relative to coherent fiber bundle structure 54. Variations of the above-stacking are possible in order to maintain the same interconnection topology. The exterior facing sides of the MPS 49 are adapted to have opto-electronic devices attached.

Figure 4C:
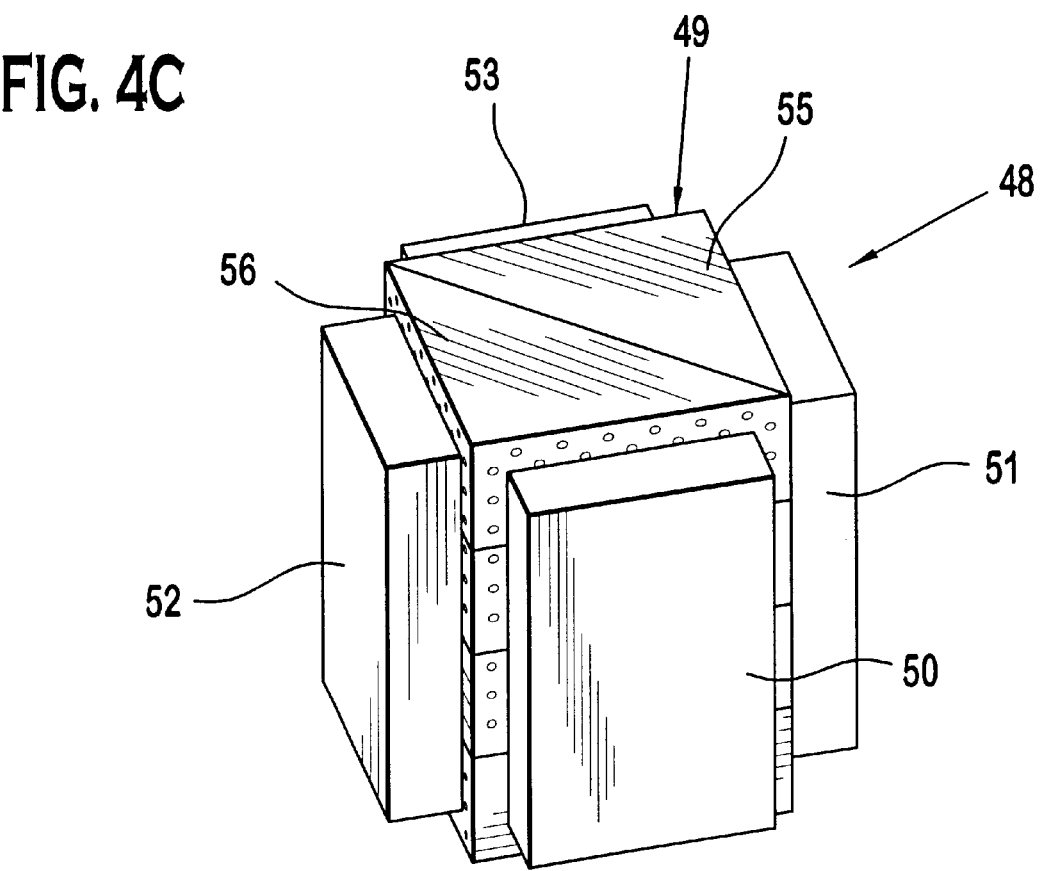
FIG. 4C is a perspective view of the alternate embodiment of a four chip optical signal transmission device of FIG. 4B with opto-electronic devices installed.

Referring to FIG. 4C, a four chip OSTD 48 is shown formed by opto-electronic chips 50–53 installed on the MPS 49. While the chips 50–53 are shown directly connected to the exterior faces of the OSTD 48, those skilled in the art will recognize that they could be remotely located and connected via fiber optic cables. Opto-electronic chips 50, 51, 52, and 53 are installed on the exterior sides of the MPS 49, with each opto-electronic chip or opto-electronic device having emitters and/or detectors located at specified locations relative to the four layers of the OSTD 48 to provide for direct optical links to the other opto-electronic devices 50, 51, 52, 53.

Figure 4D:
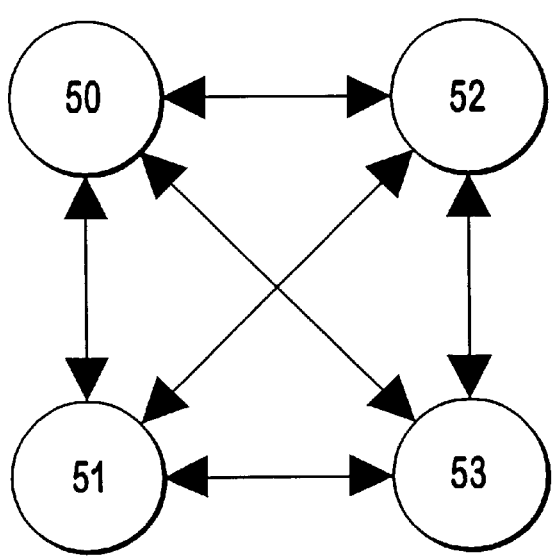
FIG. 4D is a schematic view of the interconnection topology for the alternate embodiment of the four chip optical signal transmission device of FIG. 4C.

FIG. 4D shows the interconnection topology of the four chip OSTD 48. Each of the opto-electronic chips 50, 51, 52 and 53 has optical communication capability with every other opto-electronic chip 50, 51, 52, 53. As one skilled in the art will recognize from the present disclosure, arrays of optical signal emitters and detectors may be substituted for opto-electronic chips 50, 51, 52, 53.

Figure 8A:
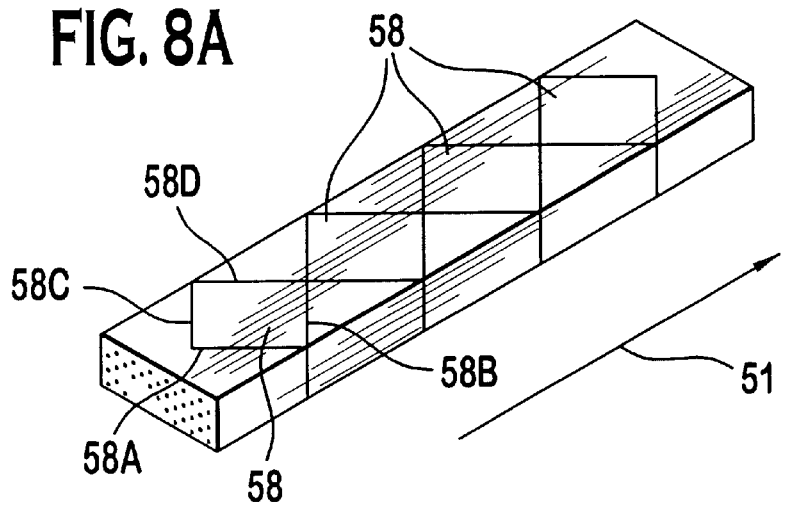
FIG. 8A is a perspective view of the formation of coherent fiber bundle structures used for a four chip optical signal transmission device.
Figure 8B:
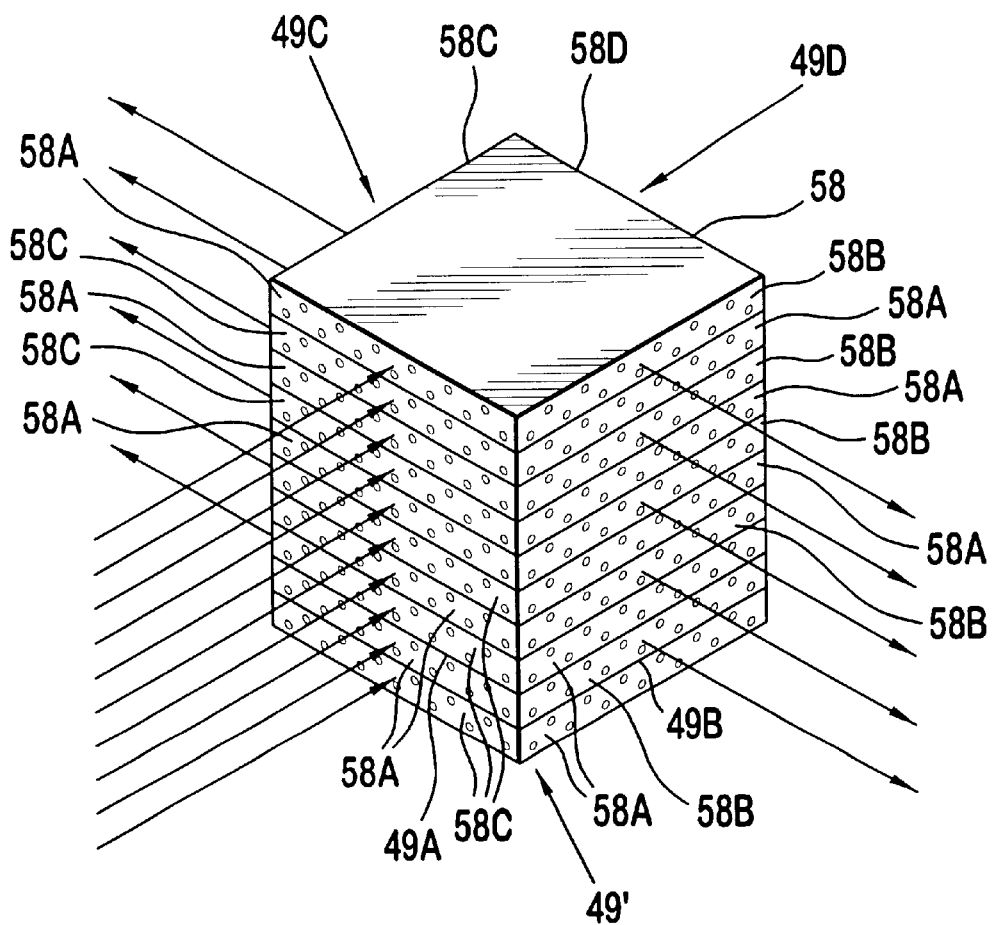
FIG. 8B is an assembled multi-path structure formed from the coherent fiber bundle structures in FIG. 8A.

An alternate design for an MPS 49' which can be used in connection with a four chip OSTD is shown in FIGS. 8A and 8B. Referring to FIG. 8A, CFBSs 58 are each formed as one piece, with the fiber direction 51 as shown. Referring to FIG. 8B, a set of at least two CFBSs 58 are stacked to provide differing orientations of fiber directions between at least one CFBS 58 relative to another CFBS 58 to form the MPS 49 having exterior faces 49A, 49B, 49C and 49D. Preferably, CFBSs 58 are stacked such that successive layers are placed with a 90° rotation to the last placed unit. Using this arrangement, opto-electronic chips installed on the exterior faces of the device may communicate with one another. Referring to FIG. 8C, the optical signal insertion angle α is approximately 45°, but may be less, as measured from a perpendicular axis to an exterior face of the MPS 49'. This allows optical signals to enter the MPS 49' without excessive transmission loss. As those skilled in the art will recognize, the CFBSs 58 could be used in combination with the CFBSs 54, 55, 56, 57, if desired.

Figure 5A:
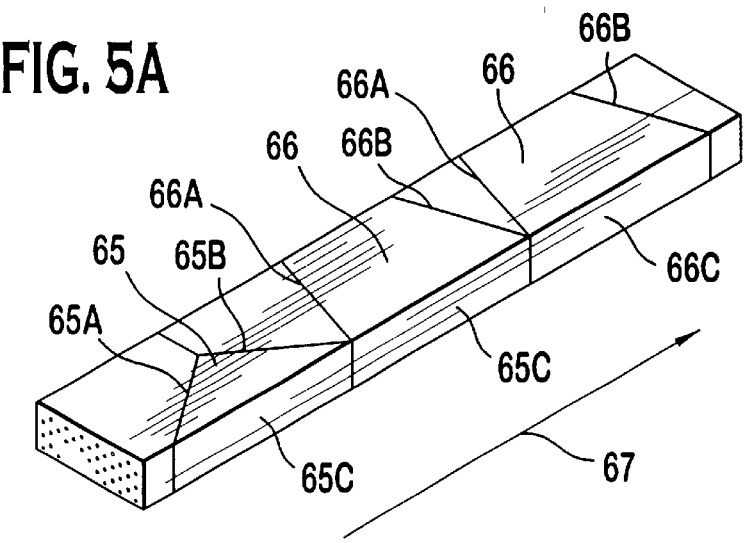
FIG. 5A is a perspective view showing the formation of coherent fiber bundle structures for a five chip optical signal transmission device.

Referring now to FIGS. 5A–5F, a five chip OSTD 59 is shown. FIG. 5A shows the production of CFBSs 65, 66 used to construct the MPS 69 for the five chip OSTD 59. The CFBSs 65, 66 are preferably formed from a segment of fiber image guide. The fiber direction is indicated by arrow 67. To form the five chip OSTD 59, CFBSs 65 and 66 are preferably formed from a piece of fused optic fiber material. The CFBS 65 is formed with transmissive exterior sides 65A and 65B, and non-transmissive side 66C. CFBSs 66 are formed with through transmissive sides 66A, 66B, and non-transmissive side 66C. Although CFBSs 65 and 66 are shown as being cut from a single piece of fiber optic material, those skilled in the art should recognize that they may be made from multiple pieces of fused optic fiber material as long as the optic fiber direction 67 is maintained relative to the CFBS geometry. CFBSs 65 and 66 may be made by cutting, forming, drawing or other suitable means, with transmissive sides 65A, 65B, 66A, 66B preferably being polished to minimize losses.

Figure 5B:
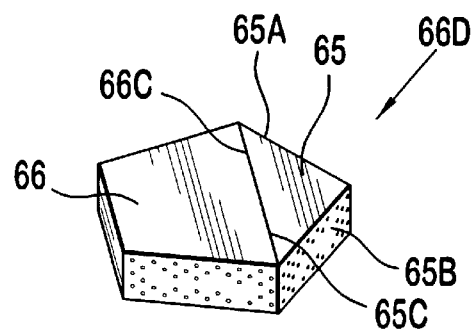
FIG. 5B is a perspective view of the arrangement of the coherent fiber bundle structures into a pentagon structure.

FIG. 5B shows the arrangement of the CFBSs 65, 66 produced in FIG. 5A for use in the MPS 69 for a five chip OSTD 59. CFBSs 65 and 66 are joined along sides 65C and 66C to form a pentagon-shaped plate 66D which will be used as a layer of the MPS 69. Alternatively, CFBSs 65, 66 could be formed together as a single piece.

Figure 5C:
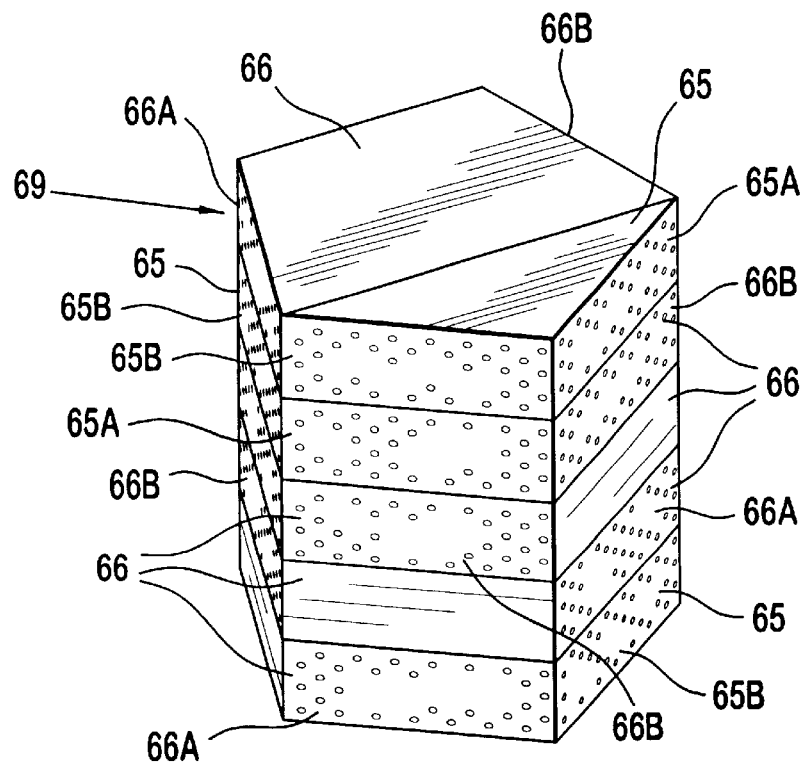
FIG. 5C is a perspective view of a stacked arrangement of the coherent fiber bundle structures of FIG. 5B to form a multi-path structure for a five chip optical signal transmission device.

FIG. 5C shows the stacked arrangement to form the MPS 69 for use in the five chip OSTD 59 with five pentagon plates 66D formed from cojoined CFBSs 65 and 66. The pentagon-shaped plates 66D are preferably rotated 72° relative to the next adjacent plate 66D in order to provide optical communication capability across different sides of the MPS 69. As one skilled in the art will recognize, different stacking arrangements may be used to accomplish different optical signal transmission capability. The exterior faces of the MPS 69 are adapted for connection to opto-electronic devices, as shown in FIG. 5E, to form the OSTD 59. The pentagon plates 66D are held together in the stacked arrangement 69 by an adhesive, fusing or other appropriate means known in the art to connect glass together.

Referring now to FIG. 5D, an optical signal insertion angle for the MPS 69 used in the five chip OSTD 59 is shown. The optical signal insertion angle α allows for optical signal input at an insertion angle α of approximately 18° or less for communication between non-adjacent sides as measured from a perpendicular face 66A or 66B of the MPS 69. The insertion angle β for communication between adjacent faces 65A and 65B is approximately 54°, and can be useful, depending upon the required application.

Referring to FIG. 5E, the OSTD 59 with opto-electronic devices 60–64 installed on the MPS 69 is shown. Opto-electronic devices 60, 61, 62, 63, and 64 may be opto-electronic chips that are optically connected on the exterior facing sides of the MPS 69 or may include remotely located opto-electronic devices connected by optic cables.

FIG. 5F shows the interconnection topology for the five chip OSTD 59 shown in FIG. 5E. The interconnection topology designates the two-way optical signal communication capability through the MPS 69 between opto-electronic devices 60–64. Variations of the interconnection topology may be achieved by omitting specific plate orientations and substituting a duplicate of another. Those skilled in the art will also recognize that the MPS 69 can be used to provide one-way communication between two or more of the opto-electronic devices 60–64, or that one or more paths could be omitted, for example, by using fewer pentagon-shaped plates 66D.

Figure 6E:
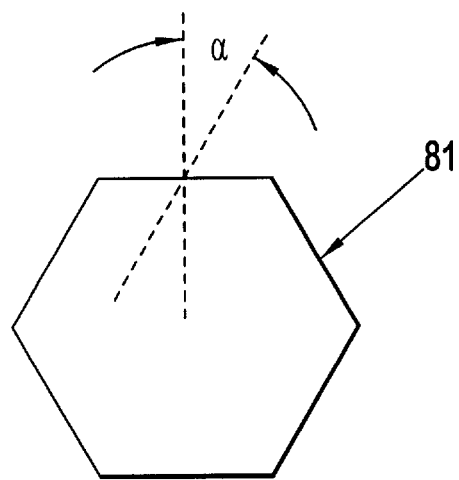
FIG. 6E is a top view showing the optical signal insertion angle for the six chip optical signal transmission device of FIG. 6D.

Referring now to FIGS. 6A–6G, a six chip OSTD 80 is shown. FIG. 6A shows the CFBSs 76, 78 and 79 used to construct the MPS 81 for the six chip OSTD 80 being formed from optic fiber material. The fiber direction 82 for the base material indicates the direction in which optical signals may travel between transmissive faces 78A, 78B and 79A, 79B. The CFBSs 78 and 79 include non-transmissive faces 78C, 79C which extend parallel to the fiber direction 82. Although shown as cut from one piece of fused optic fiber material, the CFBSs 76, 78 and 79 may be produced from separate pieces of material as long as the fiber direction 82 is maintained relative to the CFBS geometry.

FIG. 6B shows the CFBSs 78 and 79 joined to form an individual hexagon-shaped plate 83. CFBSs 78 and 79 are joined along faces 79C and 78C. FIG. 6C shows a second type of hexagon-shaped plate 8A formed from CFBS 76 and two filler pieces 77. Alternatively, the hexagon-shaped plate 83 and 84 could be formed from a single piece of fused optic fiber material of appropriate size.

Figure 6F:
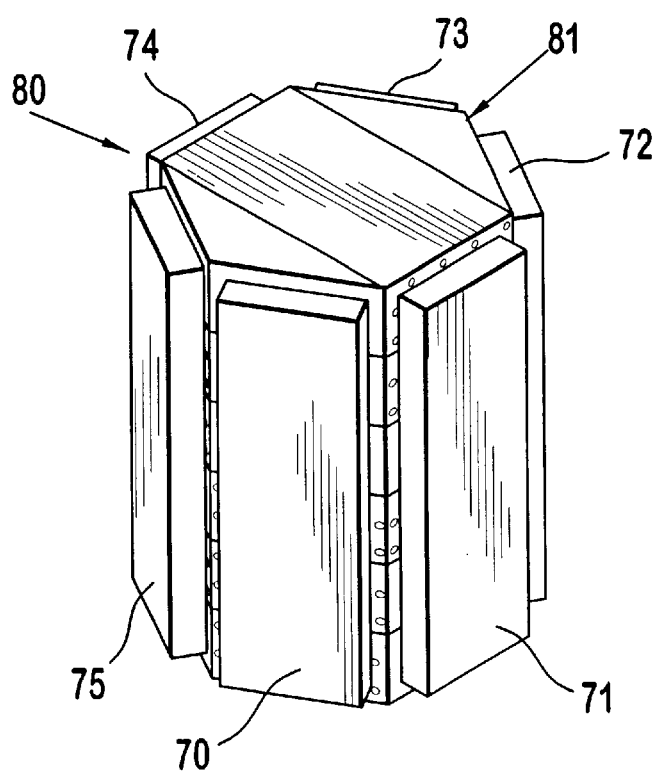
FIG. 6F is a perspective view of the six chip optical signal transmission device of FIG. 6E with opto-electronic devices installed.

To form the MPS 81 for the six chip OSTD 80, the hexagon CFBS plates 83 and 84 illustrated in FIGS. 6B and 6C are stacked, as shown in FIG. 6D, with each layer rotated as shown. The external faces of the MPS 81 are adapted for connection to opto-electronic devices, as shown in FIG. 6F. The stacking arrangement of the MPS 81 shown in FIG. 6D may be varied to alter the interconnect locations, and more or less layers could be utilized depending upon the interconnectability required.

FIG. 6F shows an optical signal insertion angle α for the six chip MPS 81. The optical signal insertion angle α is a maximum of approximately 30° as measured from the perpendicular faces 78A, 78B, 79A, 79B of the hexagon-shaped polygon CFBS 83. This provides for optical signal insertion with low insertion loss. However, other insertion angles could be used.

Figure 6G:
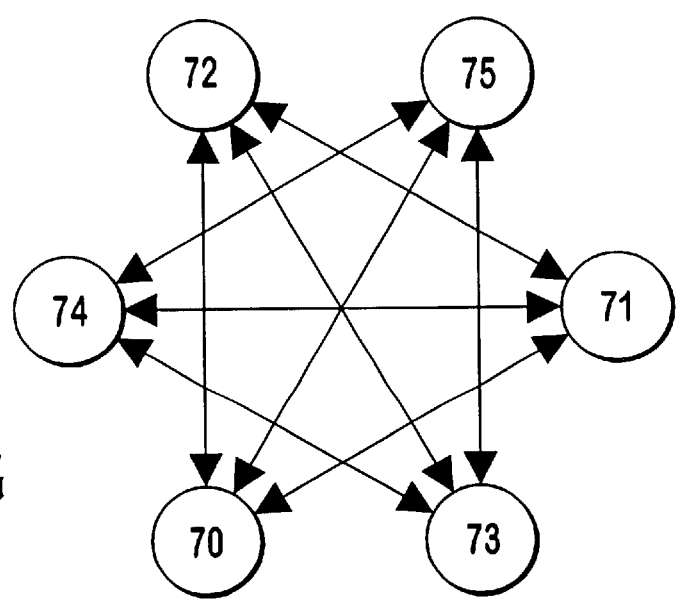
FIG. 6G is a schematic view showing the formation of the interconnection topology for the six chip optical signal transmission device of FIG. 6F.

FIG. 6E shows the six chip OSTD 80 with opto-electronic devices 70–75 installed on the MPS 81. Opto-electronic devices 70, 71, 72, 73, 74, and 75, which may be opto-electronic chips, are placed on the external sides of the MPS 81 in desired locations allowing optical signal transmission capability between the specified opto-electronic devices, as shown in FIG. 6G. Each chip 70–75 preferably has optical signal emitter and detector areas aligned with specific exterior face areas on the MPS 81 to provide optical connections. Alternatively, the opto-electronic devices 70–75 could be remotely located and connected to the MPS 81 via fiber optic cables. As will be understood by those skilled in the art from the present disclosure, differing opto-electronic communication pathways may be created by alternate stacking arrangements.

Figure 15A:
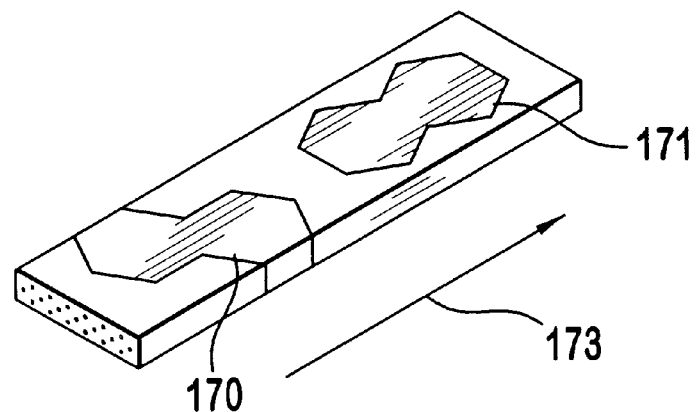
FIG. 15A is a perspective view showing the formation of coherent fiber bundle structures for a ten sided optical signal transmission device.
Figure 15B:
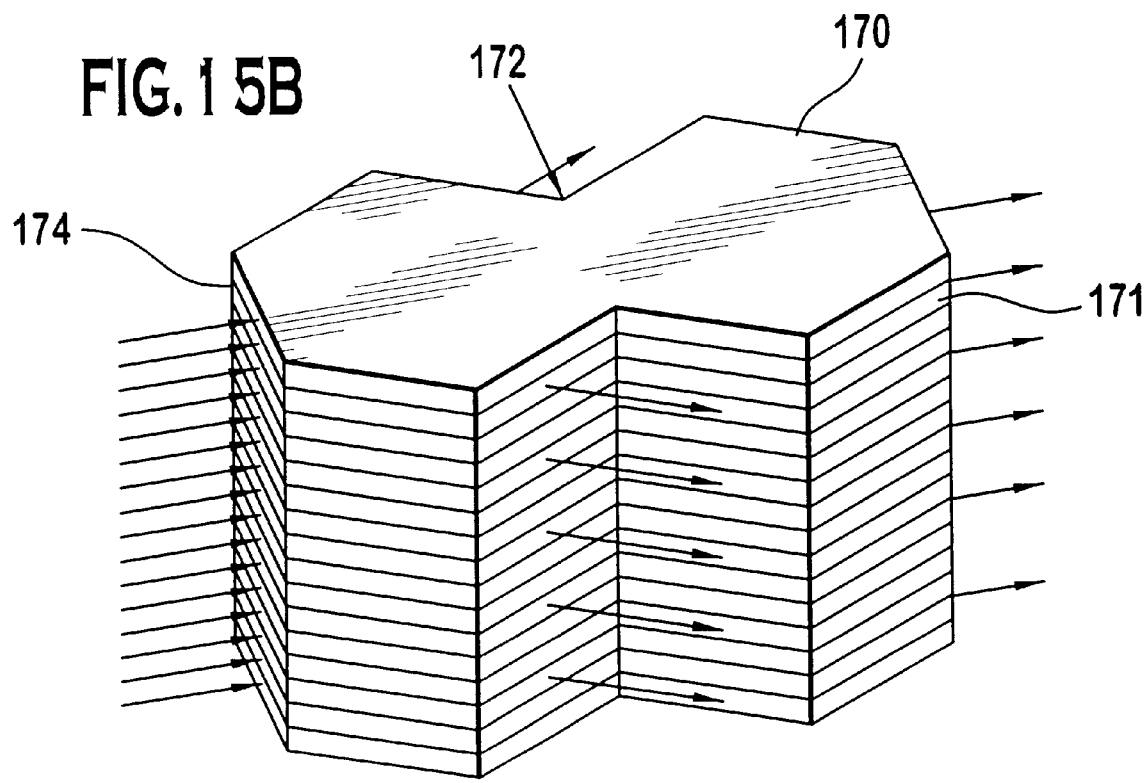
FIG. 15B is a perspective view of a ten-sided optical signal transmission device constructed from the coherent fiber bundle structures of FIG. 15A.

Referring to FIGS. 15A and 15B, a multi-sided polyhedral shaped MPS 168 for an OSTD may also be produced using CFBSs. Referring to FIG. 15A, at least two types of CFBSs 170 and 171 are produced from a single piece of fused optic fiber material. The fiber direction 173 is shown and optical signals may travel through the CFBSs 170 and 171 in the fiber direction 173. Although shown as being produced from a single piece of fused optic fiber material, CFBSs 170 and 171 may be produced from different pieces of material provided that the fiber direction 173 remains consistent with the geometry as shown in FIG. 15A.

Referring to FIG. 15B, the individual CFBSs 170 and 171 are stacked in a vertical arrangement to form the MPS 168 that allows optical signals which enter an input face 174 to be transmitted in the fiber direction of the CFBSs 170 and 171 to different output faces. According to the geometry of the CFBSs 170 and 171 as well as the fiber direction 173, optical signals may be transmitted to different exterior faces of the MPS 168. In addition to the above, the CFBSs 170 and 171 may also be formed of individual pieces and assembled in the same geometric relationship to achieve the same result. Although FIG. 15B shows three exterior faces in optical communication with the input face, differing geometries may also be used to obtain different optical communication pathways.

Referring to FIG. 20, a multi-chip OSTD 280 is shown that illustrates the scalability of the OSTDs in accordance with the present invention. CFBSs similar to those shown in FIG. 6A are used to construct hexagon shaped plates 283, 284, similar to plates 83, 84 shown in FIG. 6B. A plurality of the hexagon-shaped plates 283, 284 are used to construct an MPS 281 for the OSTD 280. The faces of the MPS 281 are large enough to support one or more opto-electronic devices or chips 271–279 to provide multiple, overlapping paths of communication for optical signals. While the illustrated embodiment is shown having a hexagonal shape, any other shape could be used, such as those discussed above in connection with the other embodiments of the invention.

As one skilled in the art will recognize from the present disclosure, multiple layer OSTDs having various suitable shapes in addition to those described in detail may be formed according to the present invention. Shapes connecting up to six opto-electronic chips are presented, however, shapes connecting greater numbers of chips are possible by simply adding additional sides to a stacked arrangement of CFBSs or by connecting multiple chips per side while ensuring the CFBSs are oriented such that optical signals travel between desired locations. Additionally, arrays of detectors and emitters connected directly or via fiber optic cables may be used in place of opto-electronic chips for all of the embodiments.

Figure 7A:
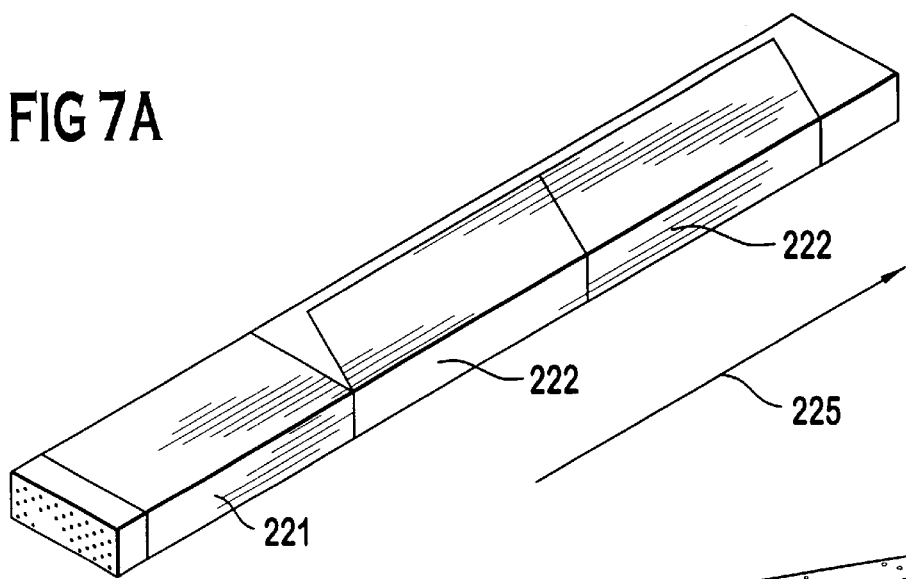
FIG. 7A is a perspective view showing the formation of coherent fiber bundle structures for a fan-in/fan-out structure.
Figure 7B:
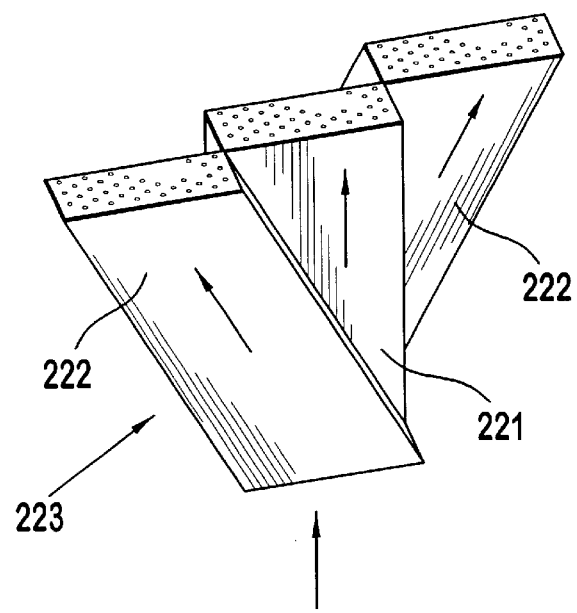
FIG. 7B is a side perspective view of the coherent fiber bundle structures of FIG. 7A in a fan-out structure.
Figure 7C:
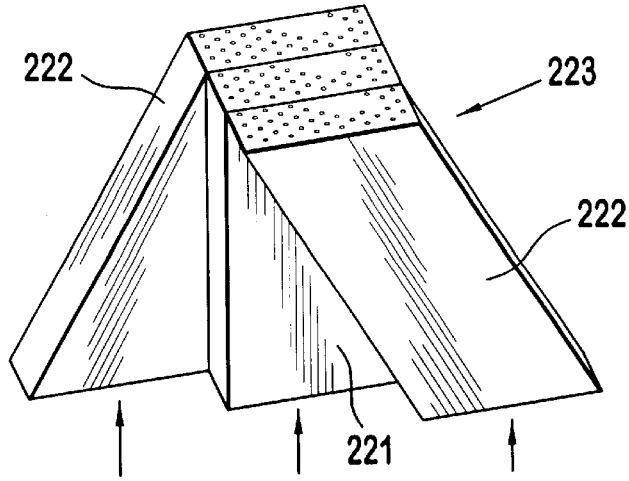
FIG. 7C is a side perspective view of the coherent fiber bundle structures of FIG. 7A for a fan-in arrangement.

Referring to FIG. 7A, CFBSs 220,221 are shown being produced from fused optic fiber material for use in a fan-out or fan-in arrangement. The CFBSs 220, 221 are preferably cut from a single piece of fused optic fiber material, but may be formed from separate pieces, if desired, as long as the fiber direction 225 is maintained. The CFBSs 220, 221 are assembled into an MPS 223, as shown in FIGS. 7B and 7C. Referring to FIG. 7B, optical signals (represented as arrows) enter a common end of the MPS 223 of grouped CFBSs 220 and 221 and are channeled such that the input optical signals are transmitted to a wider output array of output fiber groupings. Referring to FIG. 7C, the optical signals may be transmitted to narrower output array by reversing the input signal entry to the fanned-out section of the CFBSs 220, 221, as shown.

Figure 9:
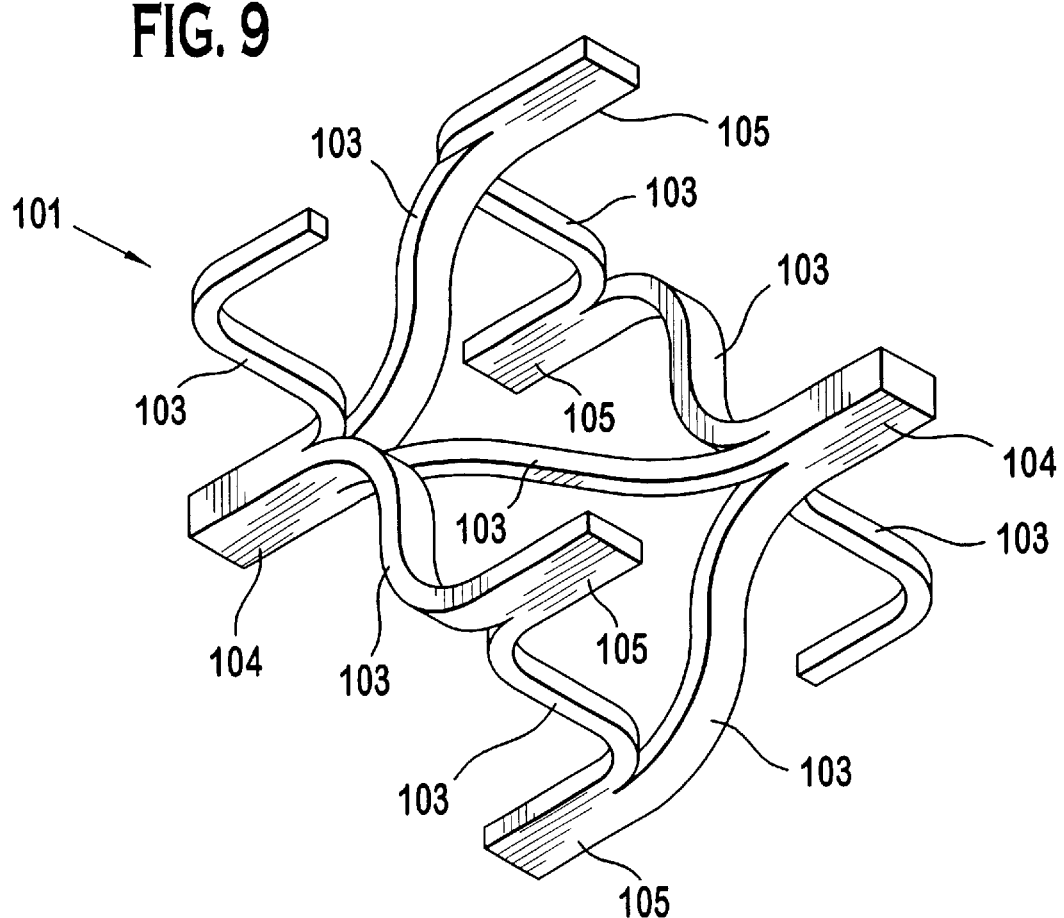
FIG. 9 is a perspective view of a multi-path structure with flexible segments.

Referring to FIG. 9, a multi-path structure with flexible segments 101 is shown. The MPS 101 is comprised of optic fiber bundles 103 having ends, some of which are side-bonded into multi-bundle groups 104, 105 to form multiple optical signal transmission pathways. The side-bonded ends are adapted to be connected to opto-electronic devices, such as opto-electronic chips or arrays of emitters and detectors. The multiple interconnects provided by the MPS 101 allows numerous opto-electronic devices to have optical signal transmission capability between them. As one skilled in the art will recognize from the present disclosure, the size and topology of the optic fiber bundles 103 may be varied, based on the particular application.

Figure 10:
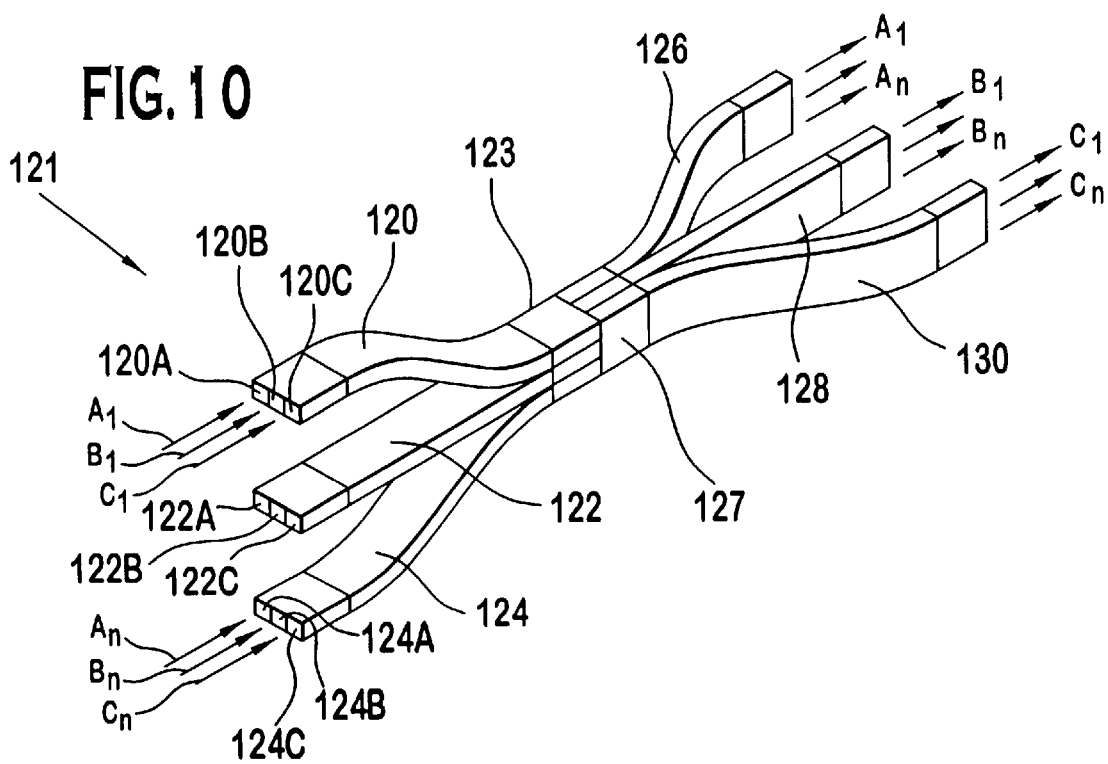
FIG. 10 is a perspective view of an end-bonded shuffle arrangement for an optical signal transmission structure.

FIG. 10 shows an end-bonded structure 121 for use in transferring optical signals between optical signal emitters and detectors. The end-bonded structure 121 is constructed of at least two groups of coherent fiber bundles. Preferably, three generally horizontally oriented rectangular fiber bundles 120, 122 and 124 are stacked vertically to form the first group and three generally vertically oriented fiber bundles 126, 128, 130 are stacked horizontally against one-another to form the second group. The vertically stacked fiber bundles 120, 122, 124 are side-connected together at their respective second ends, forming a common end 123. The horizontally stacked fiber bundles 126, 128, 130 are also side-connected at their respective second ends, forming a common end 127. The common end 123 of the first group is optically connected to the common end 127 of the second group, such that the second ends of the second group are collectively rotated approximately 90° about the common axis of the two groups relative to the second ends of the first group.

In operation, optical signals $A_1-A_n$, $B_1-B_n$, $C_1-C_n$ can enter spatially separated regions 120A–C, 122A–C, 124A–C of each bundle 120, 122, 124 of the first group and directed to separate bundles 126, 128, 130 of the second group. For example, optical signals represented by arrows $A_1$, $B_1$, $C_1$ enter regions 120A, 120B, 120C of the first bundle 120. At the midpoint of the structure 121, the inputted signals A, B, and C, still traveling in the designated regions 120A, 120B, 120C, are transmitted into corresponding regions horizontal bundles 126, 128, and 130 and are separated as shown. As one skilled in the art will recognize from the present disclosure, different configurations of multi-ended end-bonded structures may be created according to signal separation needs, and the number of bundles in each group can be varied, as well as the number of spatially separated regions in each bundle. Appropriate opto-electronic devices may be connected to the free ends of the structure 121 to transmit and/or detect optical signals. Although shown as traveling in one direction the optical signal A, B, and C, may travel in a reverse direction, allowing two-way optical signal communication.

Figure 11:
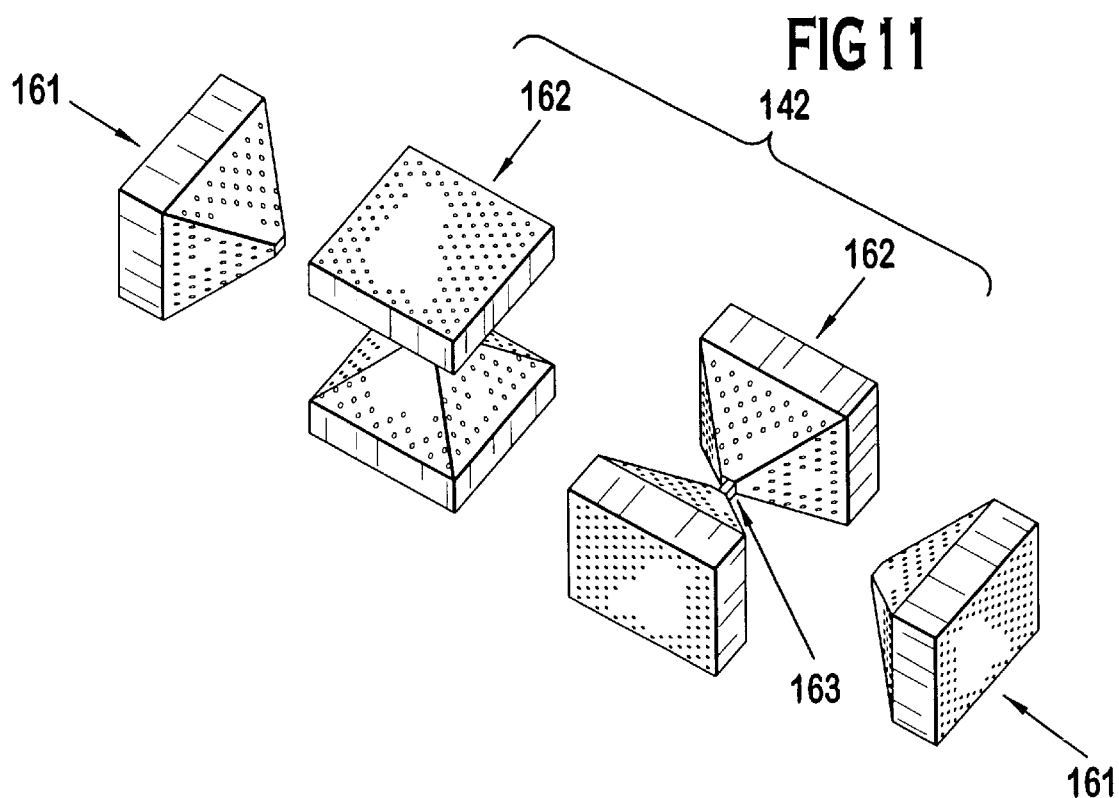
FIG. 11 is an exploded perspective view of the sub-assembly parts of a composite optical signal transmission device.
Figure 12:
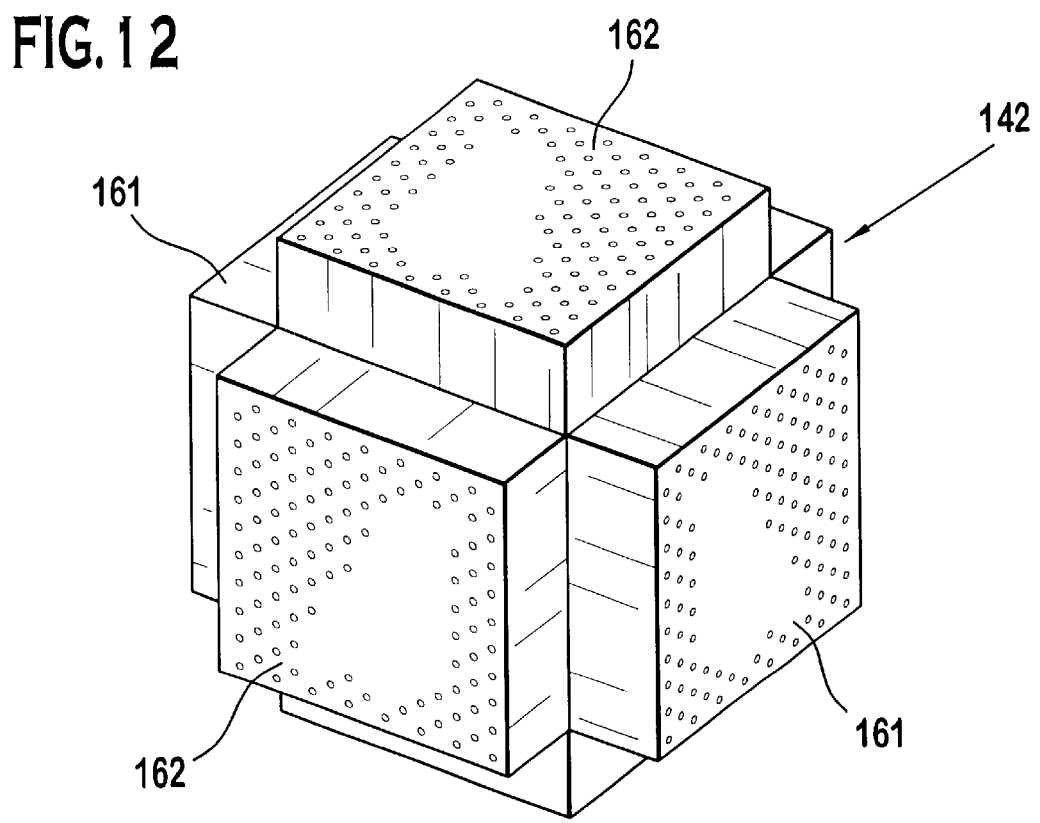
FIG. 12 is a perspective view of the assembled optical signal transmission device of FIG. 11.

Referring to FIGS. 11–14, a composite OSTD 141 formed from an MPS 142 is shown. The individual parts are produced from fused optic fiber material. As shown in FIG. 11, two CFBSs 161 are produced to have a top portion with a pyramid shape having an apex and a larger base end. The CFBSs 162 have two cojoined sections, each section including a top portion having a pyramid shape with an apex and a larger base end, with the two apexes connected together by the transition piece 163. The CFBSs 162 may be formed from multiple assembled pieces or may be machined from one piece of fused coherent optic fiber material. Referring to FIG. 12, the CFBSs of FIG. 11 are joined to form an MPS 142.

Figure 13:
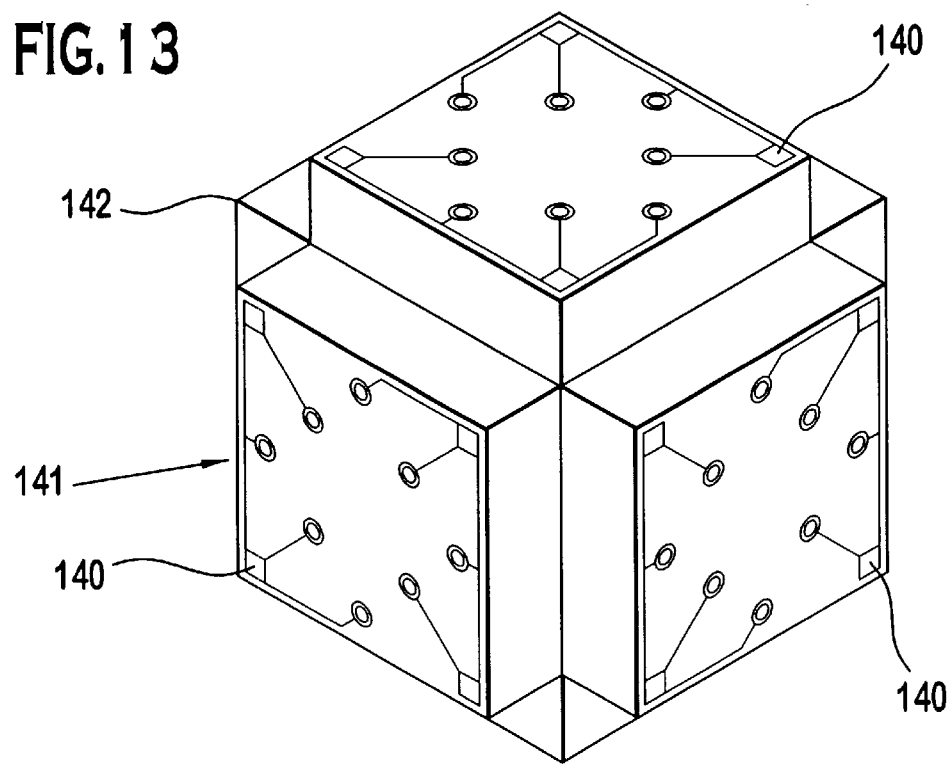
FIG. 13 is a perspective view of the assembled composite optical signal transmission device of FIG. 12 with metallized circuit attachment points.

FIG. 13 shows the assembled arrangement of the MPS 142 with metallized contacts 140 located on the exterior faces. These metallized contacts 140 provide for interconnection of opto-electronic devices, such as opto-electronic chips 152–157 on the exterior sides of the MPS 142.

Figure 14:
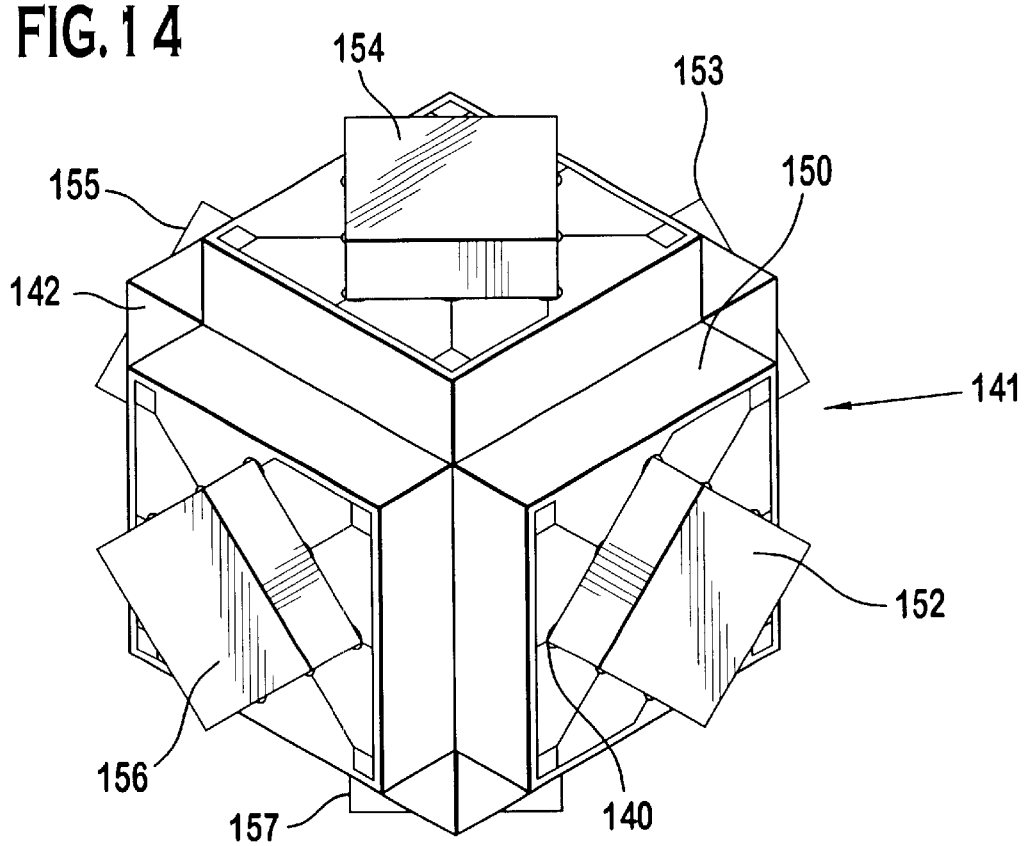
FIG. 14 is a perspective view of an assembled composite optical signal transmission device with opto-electronic devices installed.

Referring to FIG. 14, the assembled OSTD 141 is shown. In FIG. 14, opto-electronic chips 152–157 are installed upon the metallized contacts 190 on the exterior faces. The metallized contacts 140 provide connection points for opto-electronic attachment in order to form a multi-chip module. In this embodiment, each of the opto-electronic chips 152–157 is able to receive and/or transmit optical signals to adjacent chips, and the chips connected to the faces of CFBSs 162 can also receive and transmit optical signals from and to the chip on the opposite side though transition pieces 163.

Figure 16A:
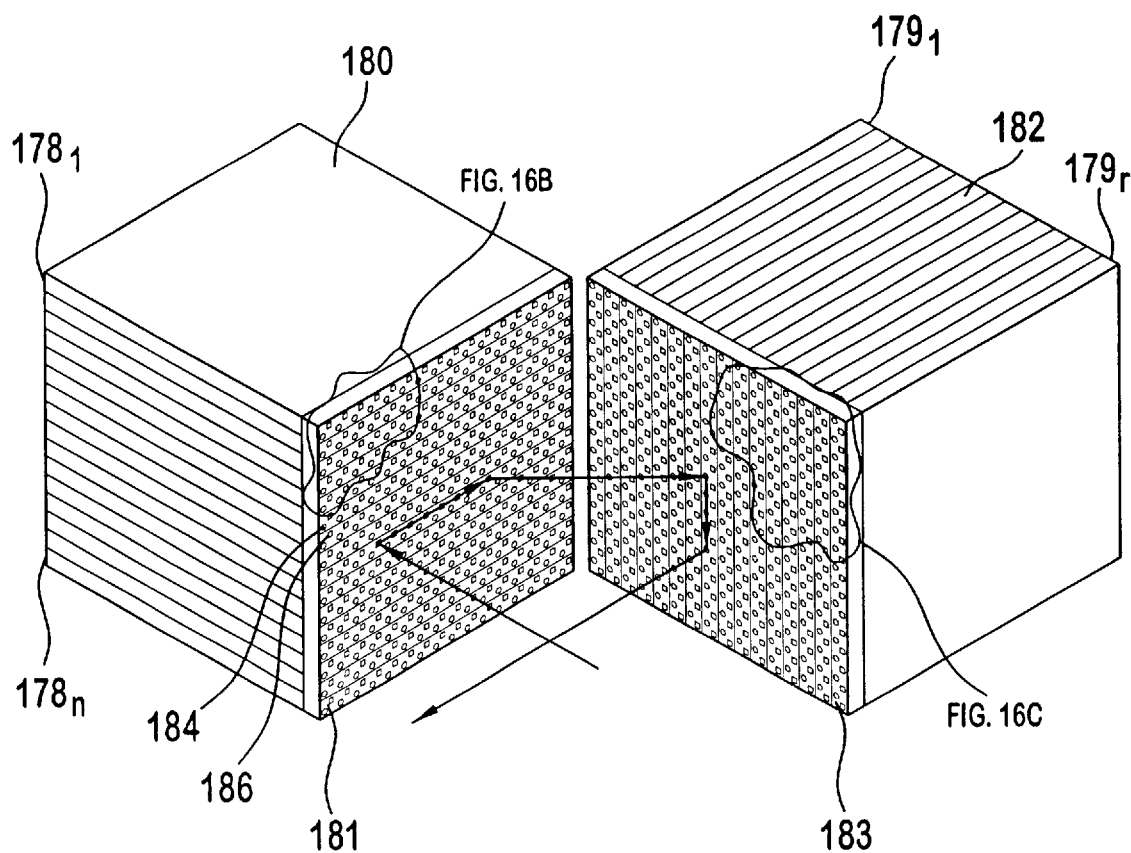
FIG. 16A is a perspective view of the two opto-electronic detector/emitter arrays shown in position to form an opto-electronic switching system when connected to a multi-path structure in accordance with the present invention.
Figure 16B:
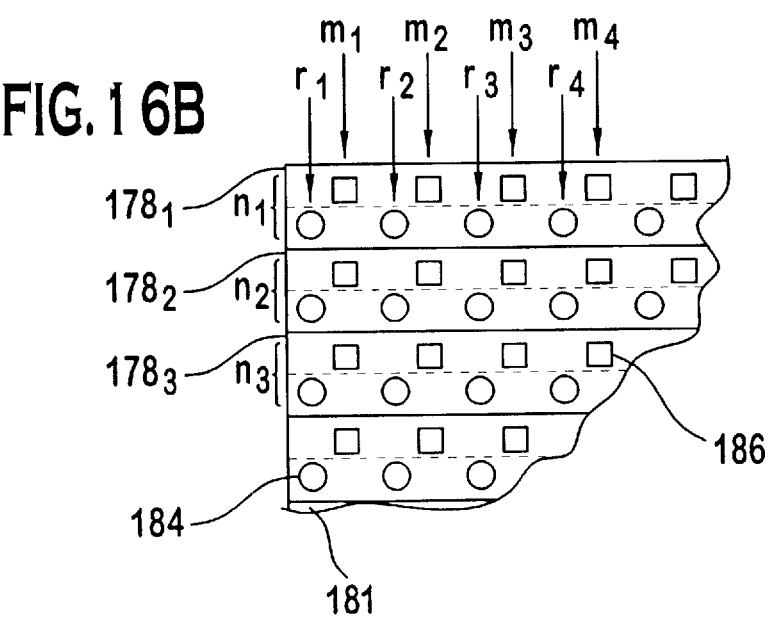
FIG. 16B is a greatly enlarged view of a portion of FIG. 16.
Figure 16C:
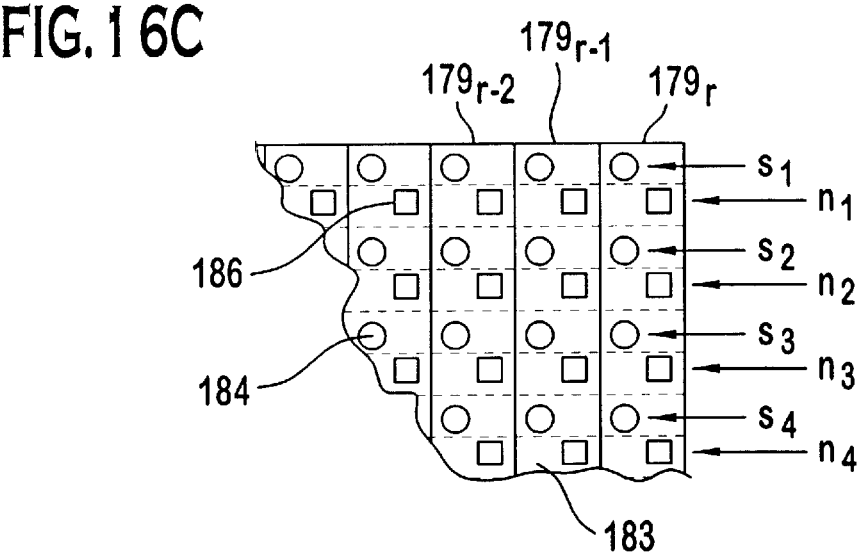
FIG. 16C is a greatly enlarged view of a portion of FIG. 16.

Referring now to FIGS. 16A–C and 17A–C, an opto-electronic switching system for routing signals in accordance with the present invention will be described in detail. FIG. 16A shows two chip stacks 180 and 182 that are located to receive an MPS 188 between them to form the opto-electronic switching system. The chip stacks 180 and 182 each have an exterior face 181, 183 which is adapted to transmit and receive optical signals. The exterior faces 181 and 183 each include an array of emitters 184 and an array of paired detectors 186, as shown in detail in FIGS. 16A and 16B. The disclosed embodiment has a 16×16 array of emitters 184 and a corresponding array of detectors 186, preferably located in emitter/detector pairs. However, other size arrays could be used. Additionally, a chip stack is not required, and any type of optical emitter/detector array could be used. The emitters 184 and detectors 186 of the chipstack 180 are arranged in alternating rows and columns with each of the n chip layers $178_1$–$178_n$ providing a 1×m array ($m_1$, $m_2$, $m_3$, ...) of detectors 186 and an associated 1×r array ($r_1$, $r_2$, $r_3$, ...) of emitters 184. The chip layers 178 allow an optical signal to be received at any of the detectors 186 where it is converted to an electric signal that is transmitted to a desired r position $r_1$, $r_2$, $r_3$, ... $r_x$ on the associated 1×r emitter array to trigger a corresponding emitter 184 to generate a second optical signal.

The chip stack 182 has n horizontally stacked vertical layers $179_1$–$179_r$ that form r columns of n detectors and a corresponding r columns of s emitters paired with the detectors (i.e.—alternating columns of detectors n and emitters s). The chip stack 182 is adapted to receive the second optical signal at an $n_{th}$ detector ($n_1$, $n_2$, $n_3$, ...) in an aligned column r of optical detectors and activate a desired optical signal emitter $s_1$, $s_2$, $s_3$ ... $s_y$ in the same column as the $n_{th}$ optical detector to generate a third optical signal in a desired $r_x$, $s_y$ location.

Figure 17A:
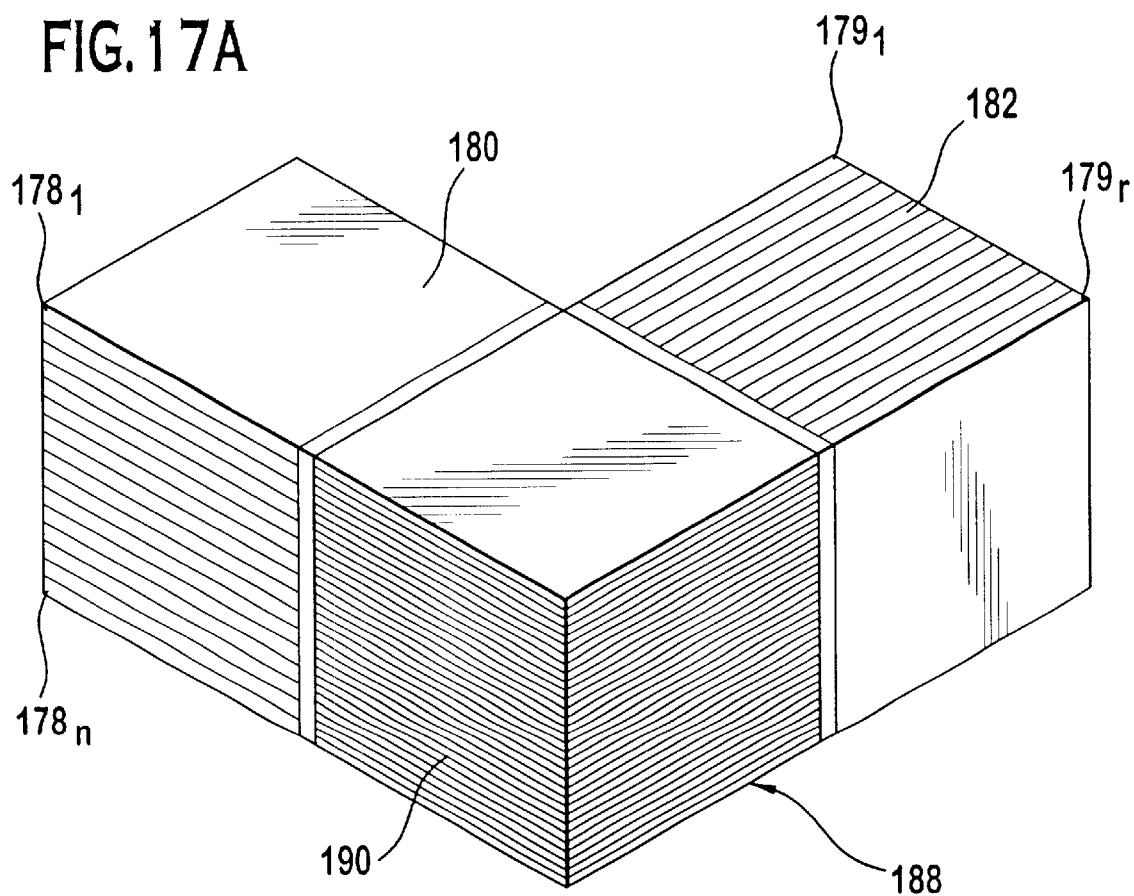
FIG. 17A is a side perspective view of the opto-electronic switching system with the multi-path structure in accordance with the present invention.
Figure 17B:
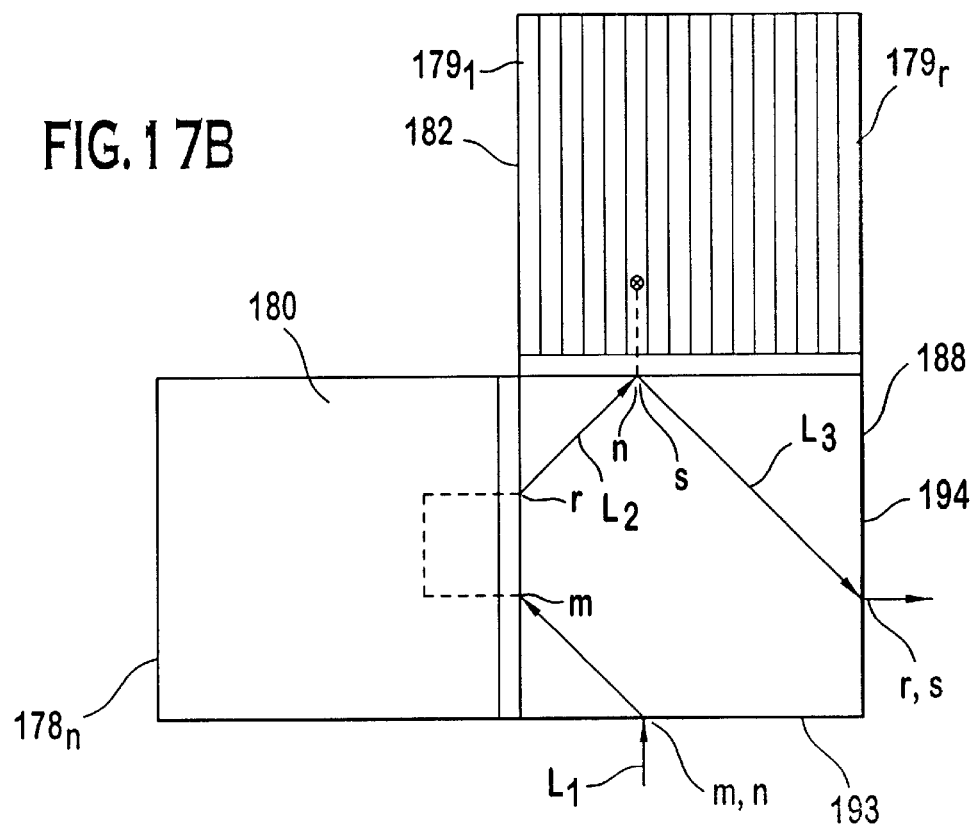
FIG. 17B is a top view of FIG. 17A, showing the path of an optical signal transmitted through the opto-electronic switching system.
Figure 17C:
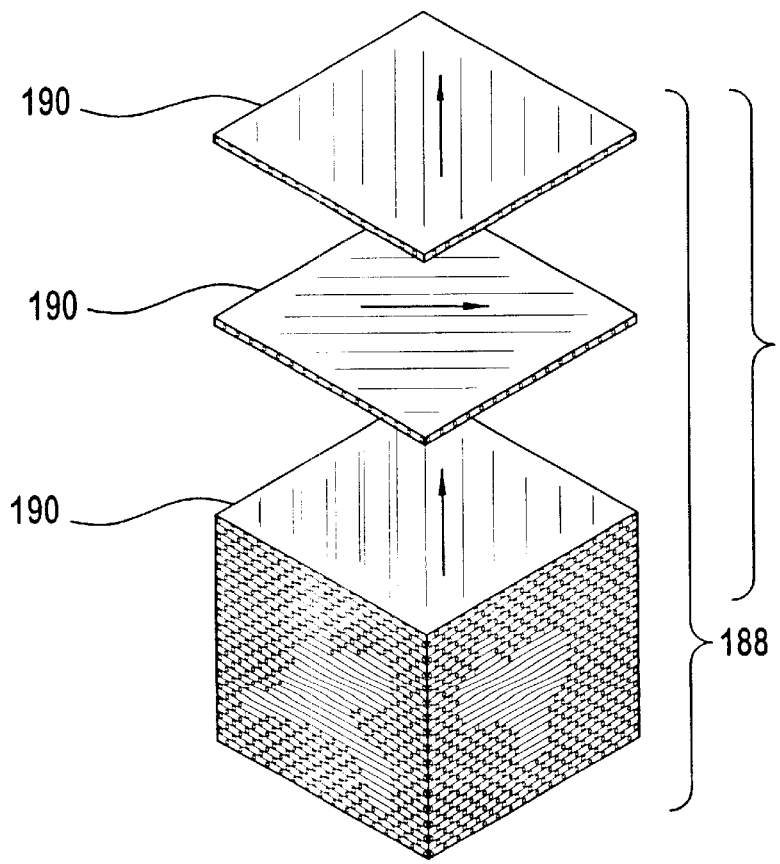
FIG. 17C is a perspective view, partially disassembled, showing the layers of the multi-path structure for the optical signal cross-bar of FIG. 17B.

Referring to FIGS. 17A–17C, the exterior faces 181 and 183 of the chip stacks 180 and 182 respectively are optically connected on the exterior sides of the MPS 188. The MPS 188 is produced from CFBSs 190 which are stacked to provide the body of a structure, as shown in FIG. 17C, with one CFBS 190 being assigned to each row of emitters 184 and detectors 186 in the chip stack 180. Each CFBS 190 may be fabricated from a single piece of fiber optic material or may be constructed from several pieces. Differing geometries and fiber directions for the MPS 188 may also be used to allow differing optical communication geometries for attached chip stacks. The CFBS 190 provide separate layers of parallel pathways between corresponding arrays of emitters 184 and detectors 186 on the exterior faces 181 and 183 of the attached chip stacks 180 and 182. By placing the MPS 188 in this manner, optical signals may be transmitted from one chip stack 180 to the other chip stack 182 in a defined manner such that the corresponding arrays of emitters 184 and detectors 186 are optically connected. Additionally, while this embodiment has been described in terms of the chip stacks 180, 182, those skilled in the art will recognize from the present disclosure that other types of opto-electronic devices could be used to form the emitter/detector arrays, such as a single chip or optic fiber connections to remotely located opto-electronic devices.

Referring to FIG. 17B, an optical signal represented by an arrow $L_1$ enters a portion of exterior force 193 of the opto-electronic switching system 188 at a defined location in an m×n array. The optical signal $L_1$ may be transmitted from an opto-electrical device connected to the opto-electronic switching system 188 or through a fiber optic cable. The optical signal $L_1$ is transmitted to an exterior face 181 of the chip stack 180 where an m detector 186 on chip layer 178n receives the signal $L_1$. The chip stack 180 processes the received optical signal $L_1$ and triggers a desired $r_x$ emitter 184 on the same chip layer 178n to emit a second optical signal $L_2$ from exterior face 181. The optical signal $L_2$ is transmitted through the corresponding aligned CFBS of the 188 to the second chip stack 182. The optical signal $L_2$ is received by a $n_{th}$ detector in a corresponding vertical chip layer 179r at a portion of the exterior face 183. The optical signal $L_2$ is processed and a desired $s_y$ emitter in the chip layer 179r is triggered at the desired $r_x$, $s_y$ position. A third optical signal $L_3$ is generated and transmitted through the opto-electronic switching system to face portion 194. By providing the chip stacks 180 and 182 with a chip layers with a relative 90° rotation relative to one another, optical signals may be generated in any position of an x-y plane for the second chip stack 182.

As shown in FIGS. 16A and 17B, the chip stacks may have varying geometries for the optical signal emitters and detectors such that emitters and detectors may be placed in rows or columns depending upon the chip stack orientation. As shown in FIG. 17C, differing layers of CFBSs may be arranged in differing configurations to provide differing interconnections. In the preferred embodiment shown in FIG. 17, a horizontal arrangement for optical signal emitters and detectors is shown for chip stack 180. For chip stack 182, a vertical arrangement is shown.

Figure 18A:
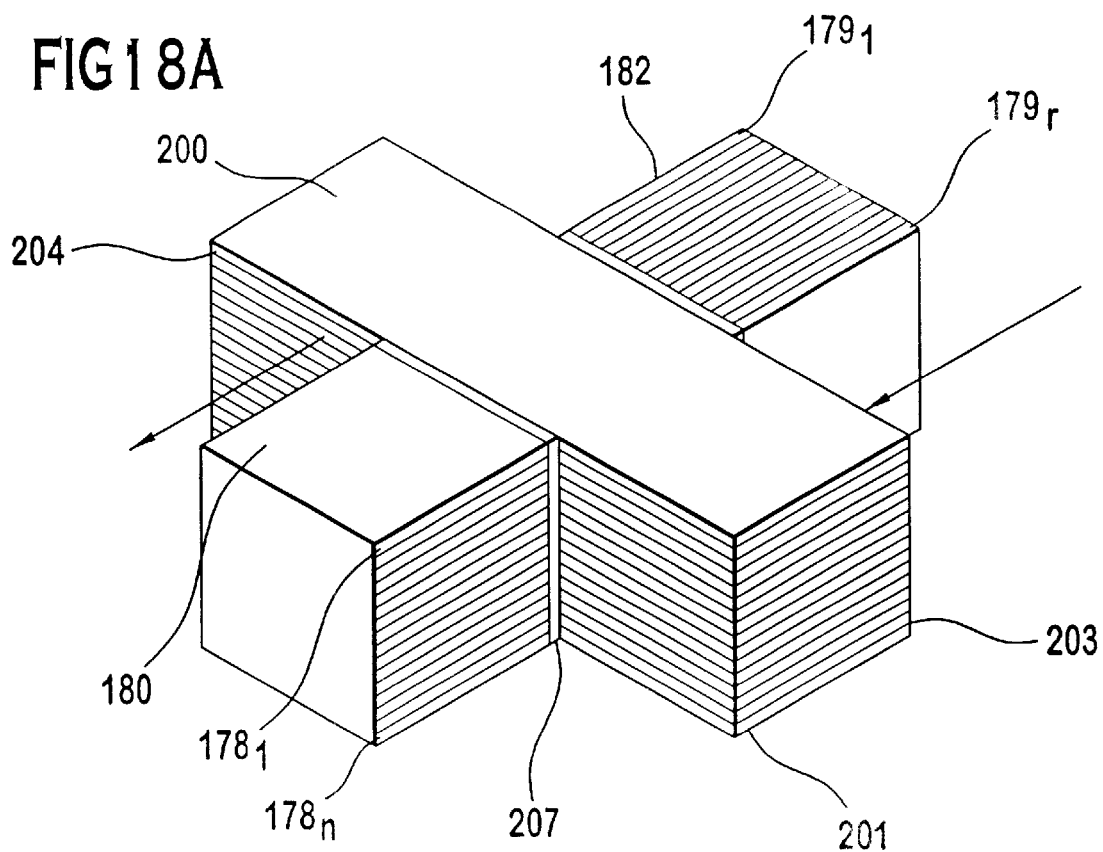
FIG. 18A is a perspective view of a linearized design of an opto-electronic switching system having low insertion angles.
Figure 18B:
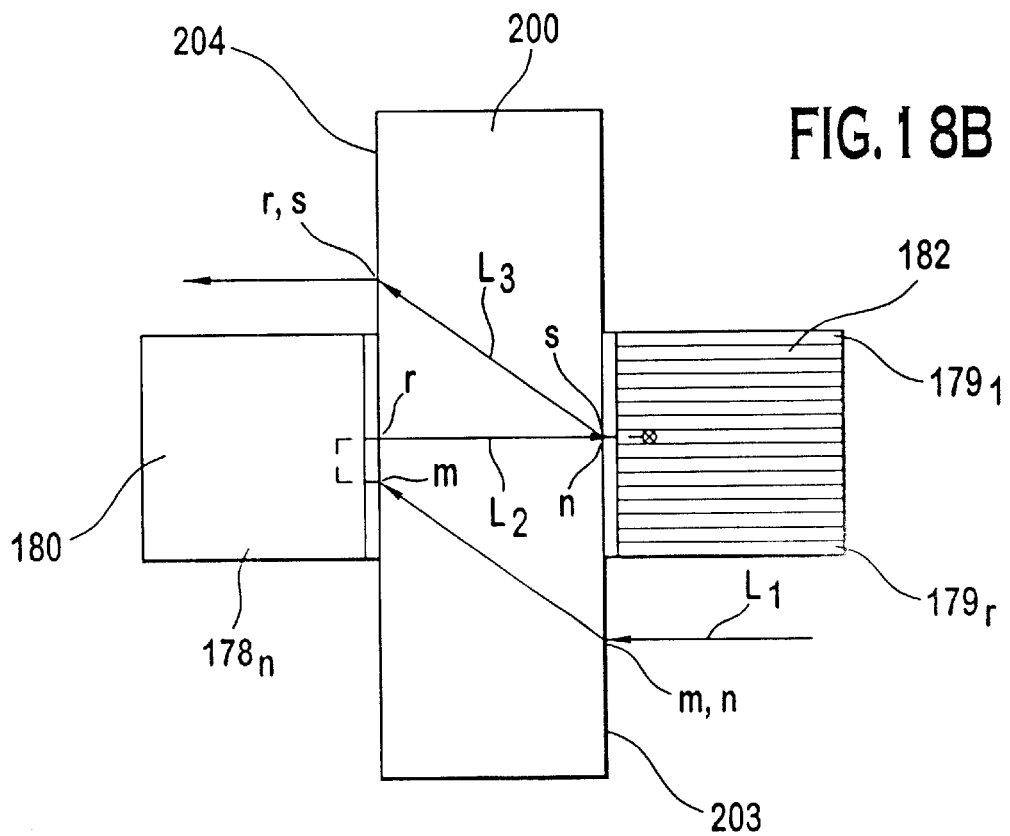
FIG. 18B is a top plan view of the optical signal transmission device of 18A.
Figure 18C:
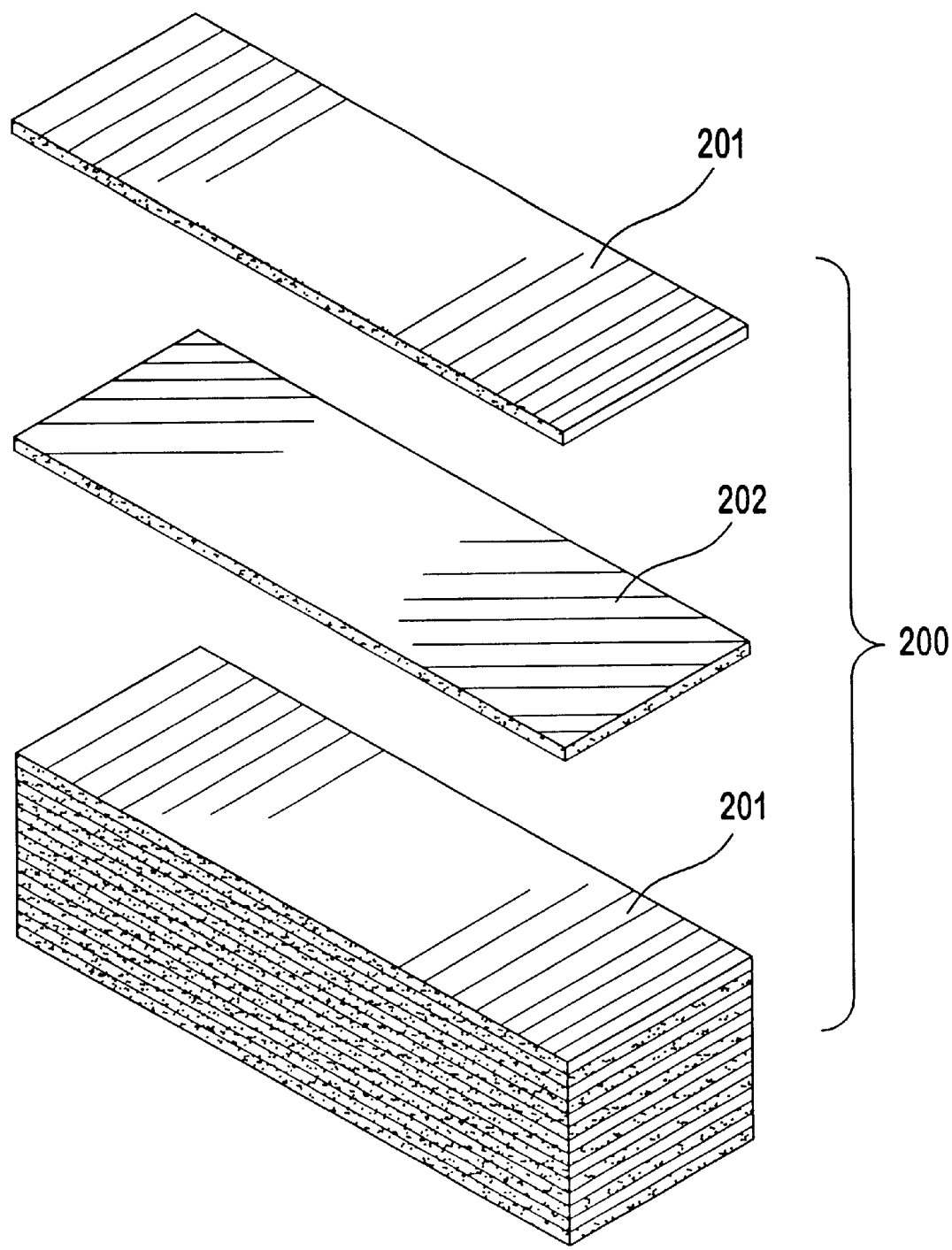
FIG. 18C is a perspective view, partially disassembled, showing the layers of the multi-path structure for the optical signal cross-bar of FIG. 18A

Referring to FIGS. 18A and 18B, a MPS 200 for use in a linearized opto-electronic switching system 210 for low insertion angles is shown. MPS 200 is produced from CFBSs 201 and 202, as shown in FIG. 18C. The CFBSs 201, 202 are stacked in an alternating arrangement to either provide direct optical signal transmission paths between opposing face portions 203, 204 or offset paths between the opposing face portions 203, 204.

The MPS 200 is adapted to receive or transmit optical signals from the opposing face portions 203, 204. The MPS 200 is assembled from CFBSs 201, 202, as shown in FIG. 18C. In the preferred embodiment, a portion of the face 203 is shown to accept an optical signal $L_1$ in a first position, with the signal being generated by any of a number of different input sources including VCSELs or other types of emitters. A portion of the face 204 is also adapted to transmit an optical signal $L_3$ from a desired r, s position based on a desired routing of original signal $L_1$. This is accomplished utilizing the chip stacks 180, 182, as described above. However, in the present embodiment, the optical signal $L_2$ from chip stack 180 is transmitted to the second chip stack 182 with a low insertion angle, preferably 0, based on the second chip stack 182 being directly across the MPS 200 from the first chip stack 180. Additionally, the insertion angle for optical signals $L_1$ and $L_3$ can be reduced by increasing the width of the MPS 200, depending on the particular application.

Referring to FIG. 18B, the input signal $L_1$ is transmitted through the MPS 200 to a portion of the exterior face 204 where it is received at the n detector in the aligned chip layer 178n of the chip stack 180. The m detector on the first chip stack 180 receives the optical signal and processes the information. A desired r emitter on the first chip stack 180 is triggered and the second optical signal $L_2$ is generated. The optical signal $L_2$ is transmitted through the MPS 200 to the second chip stack 182 where it is received by the $n_{th}$ detector in an aligned chip layer 179r which processes the optical signal $L_2$. A desired s emitter in the same chip layer 179r on the second chip stack 182 is triggered and a third optical signal $L_3$ is transmitted from the second chip stack 182 in the desired r, s position toward a portion of the exterior face 204. The optical signal may then be transferred from MPS 200 through a portion of the exterior face 203 to a fiber optic connection for a desired optic routing or to a detector of an opto-electronic device.

Figure 19A:
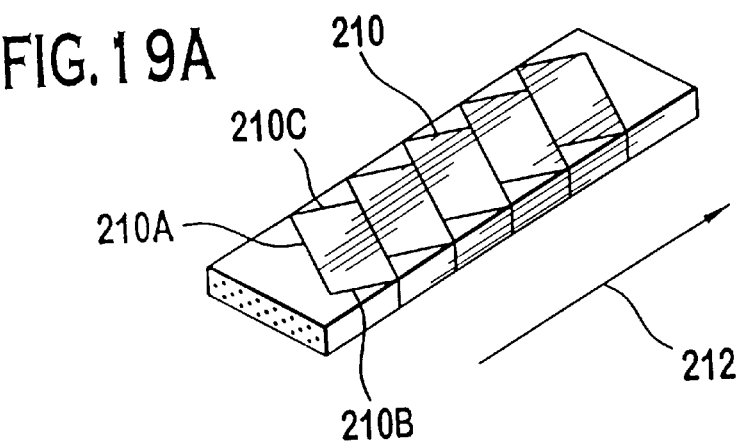
FIG. 19A is a perspective view of showing the formation of coherent fiber bundle structures for an optical signal transmission device used for signal splitting.
Figure 19B:
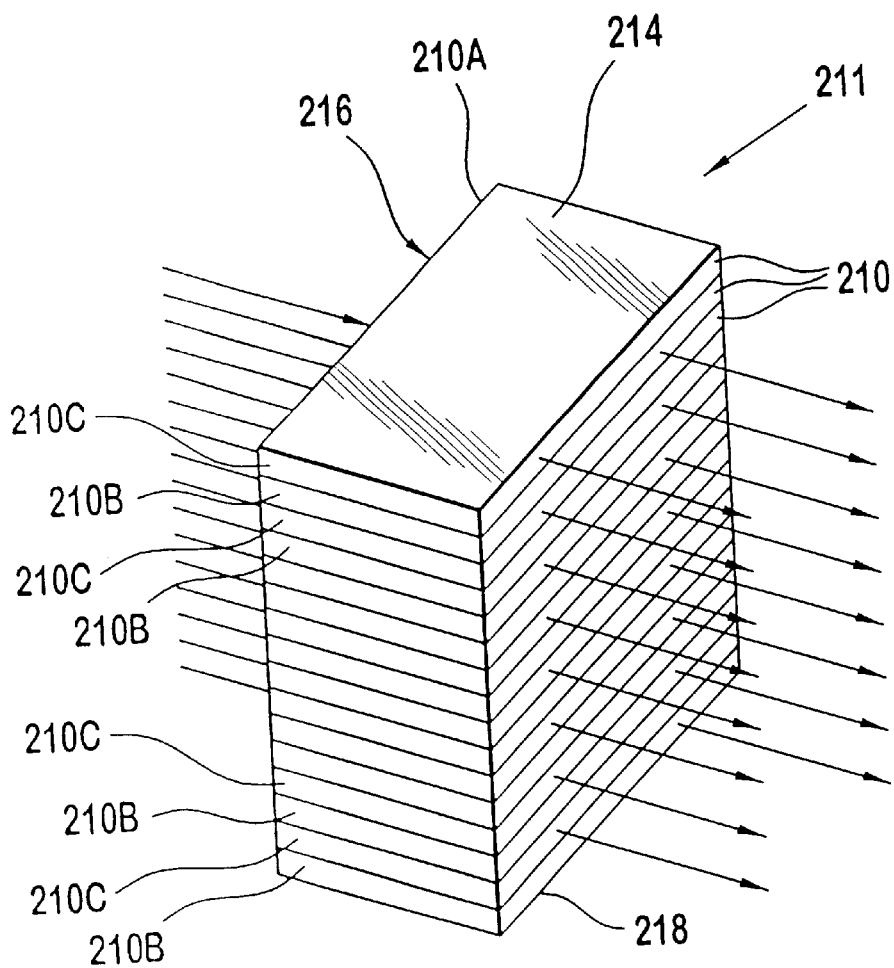
FIG. 19B is a perspective view of a multi-path structure assembled from the coherent fiber bundle structures of FIG. 19A.

Referring to FIGS. 19A and 19B, an MPS 211 which can be used as a splitter is shown. As shown in FIG. 19A, CFBS 210 are produced from a single piece of fused fiber optic material. As will be recognized by those skilled in the art, the CFBS 210 may be produced from any number of pieces of optic fiber as long as the fiber direction 212 is maintained relative to the desired configuration of the CFBSs 210. Referring to FIG. 19B, the CFBSs 210 produced from the fiber optic material are placed in a stacked arrangement 214 to form the MPS 211. Although shown as a rectilinear structure, those skilled in the art will recognize that a multitude of polyhedral shapes may be used. The CFBSs 210 are stacked such that the fiber direction 212 of alternate CFBSs 210 extend in different directions such that input signals (represented as arrows) transmitted to an input face 216 of the MPS 211 will be transmitted to a different face portion on the output face 218 of the stacked arrangement 214. The CFBSs 210 of the stacked arrangement 214 may be fastened together by an adhesive, fusion, or other suitable means as known in the art to form the stack arrangement 214.

As one skilled in the art will recognize, differing geometric configurations of the CFBSs 210 may be chosen to provide additional signal dividing capability for the MPS 211. The size of the MPS 211 may also be increased or decreased according to the specific application.

While the preferred embodiments of the invention has been described in detail, this invention is not limited to the specific embodiments described above, which should be considered as merely exemplary. Further modifications and extensions of the present invention may be developed based upon the foregoing, and all such modifications are deemed to be within the scope of the present invention.

What is claimed is:

1. An optical signal transmission device to connect optical signal emitters and detectors comprising:
    a multi-path structure, MPS, having at least three exterior faces, the MPS having at least first, second and third coherent fiber bundle structures, CFBSs, each of the CFBSs having at least a first, second, and third faces, at least the first and second faces being in optical communication with one another;
    the first face of the first CFBS forms at least a portion of the first exterior face of the MPS and the second face of the first CFBS forms at least a portion of the first and second exterior faces of the MPS;
    the first face of the second CFBS forms at least a second portion of the second exterior face of the MPS and the second face of the second CFBS forms at least a portion of the third exterior face of the MPS to provide optical communication between the second and third exterior faces of the MPS; and
    the first face of the third CFBS forms at least a second portion of the third exterior face of the MPS and the second face of the third CFBS forms at least a second portion of the first exterior face of the MPS to provide optical communication between the first and third exterior faces of the MPS;
    each of the exterior faces of the MPS being adapted to optically connect at least one of an optical signal emitter or optical signal detector to another of the exterior faces.

2. The optical signal transmission device of claim 1, wherein the exterior faces of the multi-path structure are in bidirectional communication with one another.

3. The optical signal transmission device of claim 1, wherein the CFBSs are stacked vertically.

4. The optical signal transmission device of claim 3, wherein the CFBSs are triangular shaped.

5. The optical signal transmission device of claim 1, wherein the CFBSs are positioned horizontally.

6. The optical signal transmission device of claim 5, wherein the CFBSs are triangular shaped.

7. The optical signal transmission device of claim 1, wherein the CFBSs are rigid fiber bundle structures.

8. The optical signal transmission device of claim 1, wherein the CFBSs are each produced from a one piece fiber optic plate.

9. The optical signal transmission device of claim 1, wherein the CFBSs are adapted to accept optical signals at approximately 60° or less as measured from perpendicular axes to each of the external faces of the multi-path structure.

10. The optical signal transmission device of claim 1, wherein the optical signal transmission device has n side faces, and at least one of the CFBSs has n faces, where n is greater than or equal to 3.

11. The optical signal transmission device of claim 1, wherein the device is adapter for use as a router.

12. The optical signal transmission device of claim 1, further comprising opto-electronic devices connected to the exterior faces of the MPS.

13. The optical signal transmission device of claim 1, wherein the optical signals comprise visual images.

14. The optical signal transmission device of claim 1, wherein the optical signals comprise optical data communication links.

15. The optical signal transmission device of claim 1, wherein there are at least four stacked CFBSs arranged to form an MPS with a rectilinear structure.

16. The optical signal transmission device of claim 1, wherein the MPS has at least five exterior side faces.

17. The optical signal transmission device of claim 1, wherein the CFBSs include generally planar top and bottom surfaces, and are vertically stacked in layers to form the MPS, at least one layer being formed from two CFBSs.

18. A method of transmitting optical signals between at least three opto-electronic chips through a one-piece optical signal transmission device having at least three sides comprising:

providing a first opto-electronic device with at least one signal emitter and detector on a first side of the optical signal transmission device;

providing a second opto-electronic device with at least one signal emitter and detector on a second side of the optical signal transmission device;

providing a third opto-electronic device with at least one signal emitter and detector on a third side of the optical signal transmission device;

optically connecting the at least one optical signal emitter on the first opto-electronic device with the at least one signal detector on the second opto-electronic device through a first coherent fiber bundle structure, CFBS, of the optical signal transmission device;

optically connecting the at least one signal detector on the first opto-electronic device to the at least one signal emitter on the third opto-electronic device through a second CFBS of the optical signal transmission device;

optically connecting the at least one optical signal emitter on the second opto-electronic device to the at least one signal detector on the third opto-electronic device through a third CFBS of the optical signal transmission device;

emitting optical signals from the signal emitters on the first, second and third opto-electronic devices;

transmitting the optical signals through the optical signal transmission device to the signal detectors; and receiving each of the emitted signals at the optically connected signal detector.

\* \* \* \* \*